(12) United States Patent
Zauderer

(10) Patent No.: US 6,722,295 B2
(45) Date of Patent: Apr. 20, 2004

(54) METHOD FOR THE COMBINED REDUCTION OF NITROGEN OXIDE AND SULFUR DIOXIDE CONCENTRATIONS IN THE FURNACE REGION OF BOILERS

(76) Inventor: Bert Zauderer, 275 N. Highland Ave., Merion Station, PA (US) 19066

( * ) Notice: Subject to any disclaimer, the term of this patent is extended or adjusted under 35 U.S.C. 154(b) by 58 days.

(21) Appl. No.: 09/964,853

(22) Filed: Sep. 28, 2001

(65) Prior Publication Data

US 2002/0061271 A1 May 23, 2002

Related U.S. Application Data

(60) Provisional application No. 60/236,355, filed on Sep. 29, 2000.

(51) Int. Cl.[7] .............................................. C01B 17/60
(52) U.S. Cl. ..................... 110/345; 423/235; 423/239.1; 423/243.01; 423/243.06; 423/243.08; 423/244.01; 423/244.07; 423/244.08
(58) Field of Search ............................ 423/235, 243.01, 423/243.06, 243.08, 244.01, 244.07, 244.08, 239.1; 110/345

(56) References Cited

U.S. PATENT DOCUMENTS

| | | | | |
|---|---|---|---|---|
| 4,666,690 A | * | 5/1987 | Sommerlad | 423/242 |
| 5,051,245 A | * | 9/1991 | Wilson | 423/242 |
| 5,273,727 A | * | 12/1993 | Johnson | 423/243.06 |
| 5,399,326 A | * | 3/1995 | Young | 423/235 |
| 6,048,510 A | * | 4/2000 | Zauderer | 423/235 |
| 6,474,271 B1 | * | 11/2002 | Widmer et al. | 122/405 |

* cited by examiner

*Primary Examiner*—Wayne A. Langel
(74) *Attorney, Agent, or Firm*—McGuireWoods LLP

(57) ABSTRACT

A method for the combined reduction of sulfur dioxide, $SO_2$, and nitrogen oxides, $NO_x$, in the gas stream of a furnace from the combustion of fossil fuels is disclosed. In a narrow gas temperature zone in a furnace, $NO_x$ is converted to nitrogen by reaction with a reducing agent such as urea or ammonia with negligible residual ammonia and other reaction pollutants. In about this same temperature zone, $SO_2$ will react with calcium oxide particles, derived from the calcination of lime, $Ca(OH)_2$, or limestone, $CaCO_3$, to form $CaSO_4$ particles. A wide size distribution of aqueous droplets, containing dispersed lime or very fine limestone particles and dissolved urea or ammonia, is injected at the outer edge of the furnace gas zone at which the $SO_2$ and $NO_x$ reduction reaction are effective. The key element in this invention is that the aqueous droplet size distribution is optimized for the specific furnace dimension while the concentration of the reactants, urea or ammonia and lime or very fine limestone, is optimized for optimum reaction rates. Special injectors produce the different size droplets that vaporize throughout said gas zone, thereby distributing said lime or limestone particles and urea or ammonia gas molecules exclusively throughout the combustion gas zone being treated. Also disclosed is a system to produce said aqueous mixture and effectively accomplish this injection. This method can be combined with other $NO_x$ and $SO_2$ reduction processes to sharply reduce overall $NO_x$ and $SO_2$ emissions from the combustion gas effluent.

24 Claims, 4 Drawing Sheets

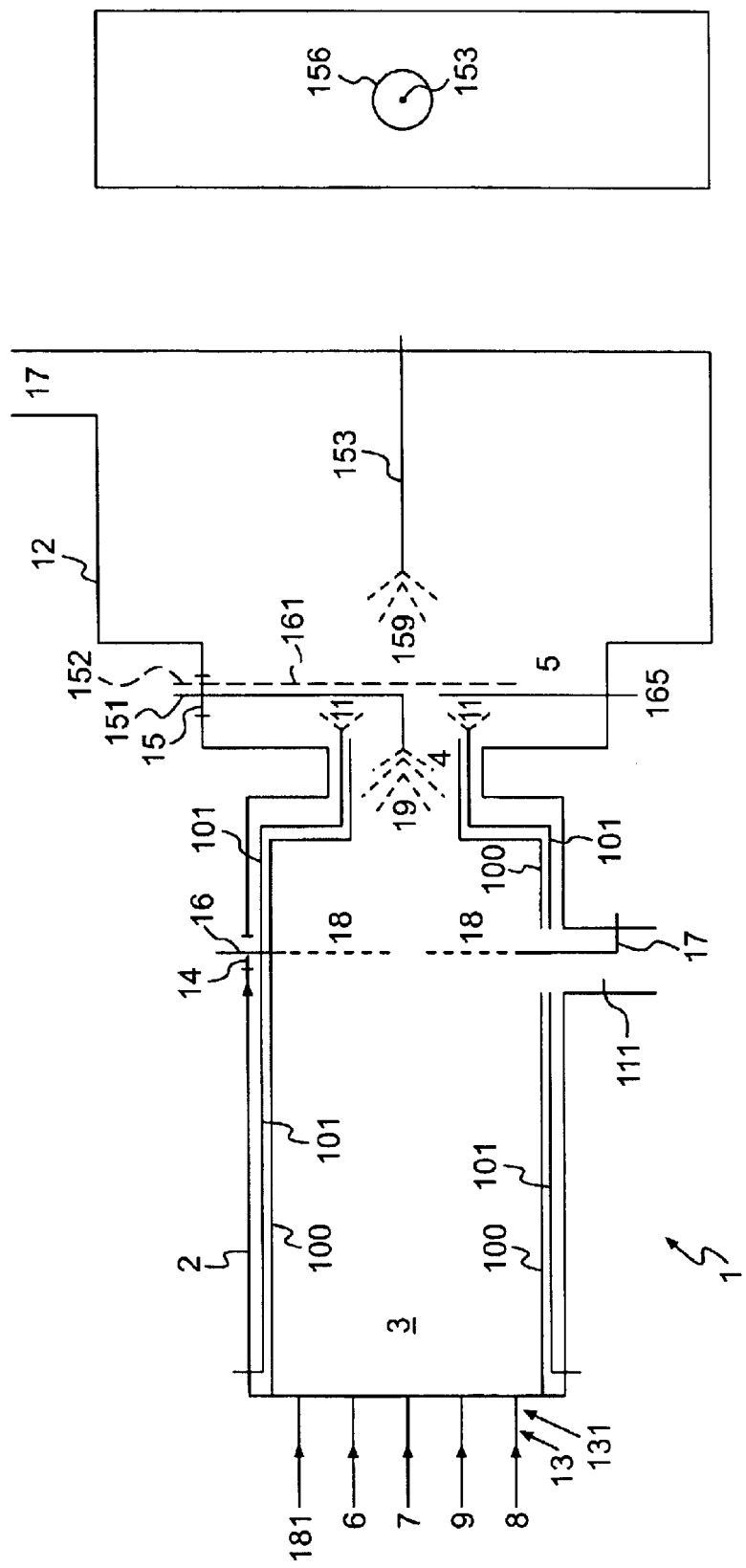

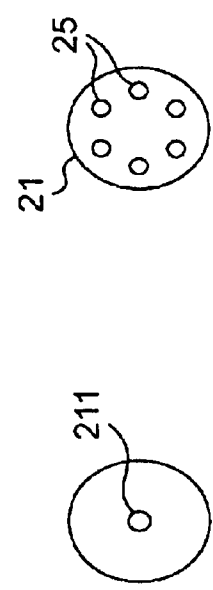
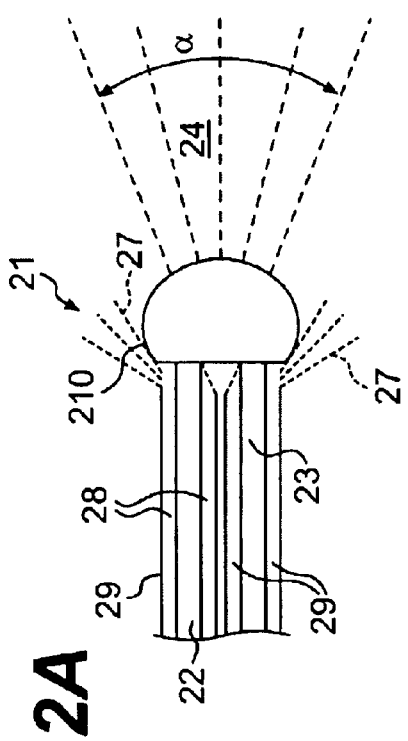
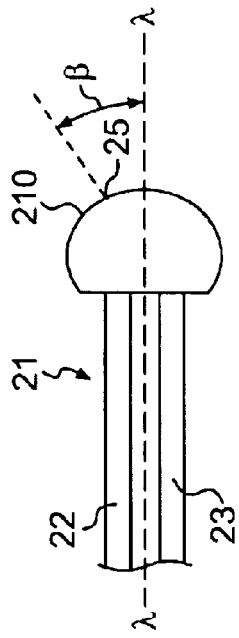
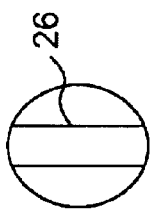
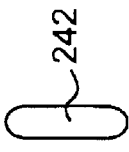
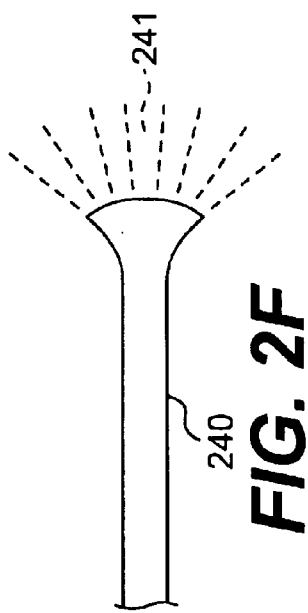

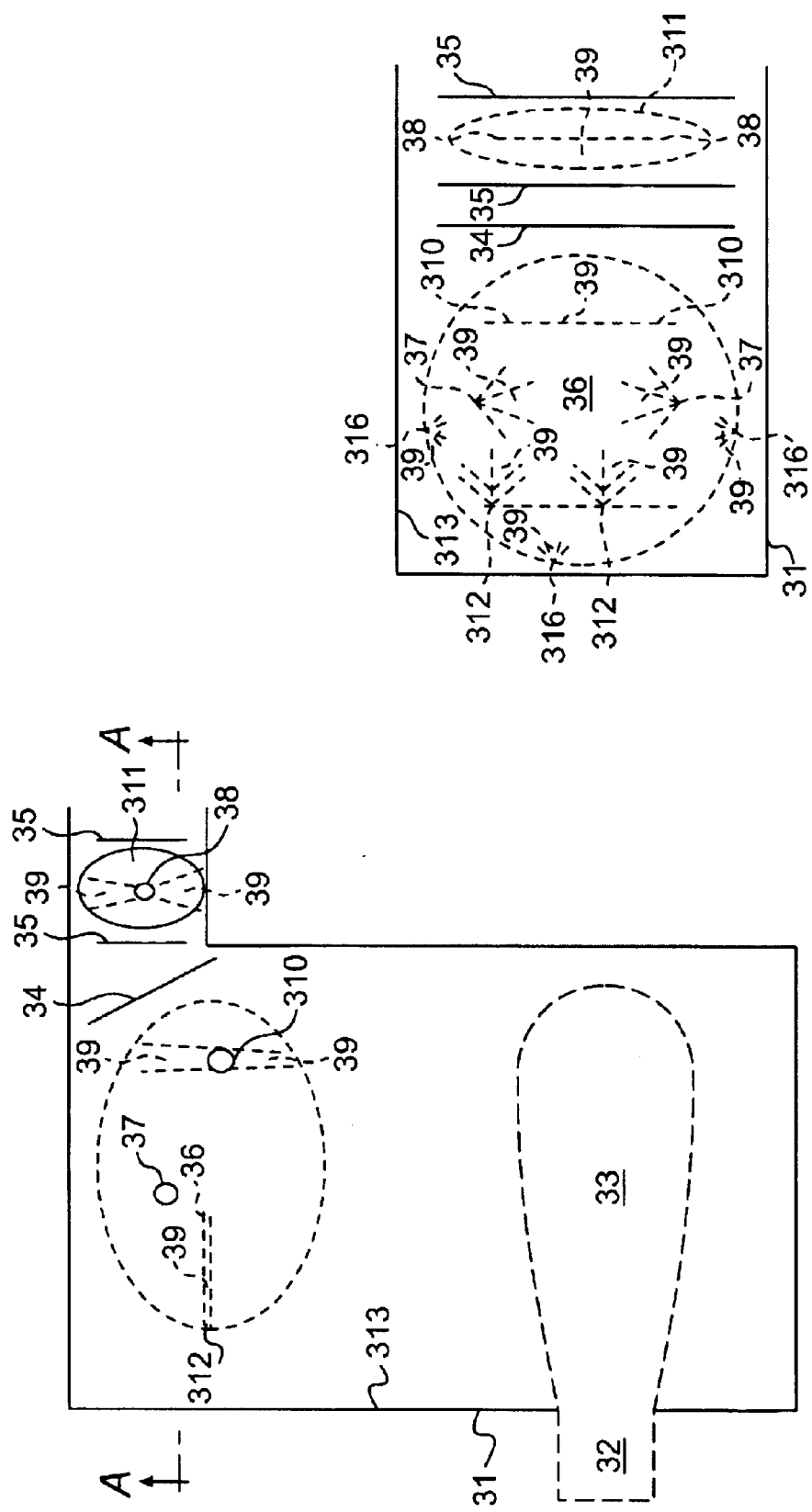

METHOD FOR THE COMBINED REDUCTION OF NITROGEN OXIDE AND SULFUR DIOXIDE CONCENTRATIONS IN THE FURNACE REGION OF BOILERS

This application is based on U.S. Provisional Application No. 60/236,355, filed on Sep. 29, 2000 and is herein incorporated by reference in its entirety.

BACKGROUND OF THE INVENTION

The present invention discloses a method for the simultaneous reduction of the concentrations of sulfur dioxide, $SO_2$, and nitrogen oxides, $NO_x$, in the products of combustion of a fossil fuel. The method consists of injecting into the combustion gas stream, liquid droplets containing lime or very fine limestone particles dispersed in water and urea or ammonia dissolved in the same water. Said particle dispersion and solution are produced in a supply vessel by continuous mixing of the lime or very fine limestone solids and the urea solids or ammonia liquid in concentrations of up to 30% by weight for the lime or very fine limestone and up to 10% by weight of the urea or ammonia in the water. Under certain conditions, such as preparing the mixtures in large vessel in which the mixture will remain for extended periods of time, it may be desirable to augment the continuous mixing by the addition of a surfactant and/or stabilizer in order to maintain a uniform dispersion of the lime or very fine limestone particles. Injection of this mixture takes place in a furnace in a temperature range from about 1700° F. to 2200° F., where both the calcination of lime or very fine limestone and the subsequent reaction of calcium oxide with $SO_2$ and the reaction of urea or ammonia molecules with $NO_x$, are effective. Specifically, the method disclosed consists of preferably using air atomized water droplet injectors that are designed to disperse said droplets exclusively in the optimum gas temperature zone at which vaporization of the droplets disperses the lime or very fine limestone particles and the urea or ammonia gas molecules throughout said gas zone where the SO2 and $NO_x$ reduction reactions are effective.

Coal is the primary fuel for utility boilers, and to efficiently burn it requires combustion at 3000° F. or higher. Very extensive deposits of high sulfur coals that contain fuel bound nitrogen are available in the Eastern half of the United States, and the use of this coal, especially in the mid-Western States is a major source of $SO_2$ and $NO_x$ pollution in the Eastern United States.

The combustion of fossil fuels leads to the formation of $NO_x$ and $SO_2$, pollutants that lead to smog and acid rain over wide areas far removed from the combustion source, and it is especially a problem in urban environments. There are two sources of $NO_x$, one is primarily formed during the combustion of solid fossil fuels, namely coal. The fuel bound nitrogen whose concentration is generally in the range of 1%, by weight in the coal is the primary source of $NO_x$ in coal combustion. Additionally, combustion with oxygen in excess of the amount required for stoichiometric combustion, which is required for all fossil fuels to minimize other pollutants, such as carbon monoxide, results in the formation of thermal $NO_x$. The thermal $NO_x$ concentration rises substantially at temperatures above about 3000° F.

Several technologies are used to control the emissions of $NO_x$ from fossil, and especially from coal, fired boilers. Among these control technologies are: staged combustion in which initial fuel rich-combustion near the fuel injection zone is followed by excess air combustion in the furnace region of the boiler. There are a number of different staged combustion processes and system designs, depending on the boiler design. Another $NO_x$ control process is selective catalytic reduction, SCR, in which the relatively cold combustion gas effluent from a boiler of several 100° F., is passed over a catalyst coated bed in the presence of ammonia. Another process, generally called selective non-catalytic reduction, SNCR, involves the injection of various chemical compounds, primarily urea or ammonia, with or without various chemical additives, into the combustion gases in the boiler furnace at temperatures at which the $NO_x$ to $N_2$ reaction is favored. The method of the present invention falls within the field of SNCR processes. While all these $NO_x$ control processes reduce $NO_x$ emissions to varying degrees, they all have certain technical and economic disadvantages. For example, staged combustion results in unburned carbon in the fly ash, which represents an energy loss and may make the fly ash unsuitable for recycling. Also in a certain staged combustion design, called low $NO_x$ burners, chemical compounds can form that corrode boiler metal tubes. SCR requires costly catalyst structures, and regular catalyst replacement. The present invention utilizes a SNCR method. It incorporates key elements of Zauderer's prior invention, (U.S. Pat. No. 6,048,510, herein incorporated by reference in its entirety) in that it eliminates some of the technical disadvantages in the prior invention by assuring a simpler and more uniform method of introducing the urea into the hot combustion gases and it shows that urea is preferred to ammonia for this process. These improvements are the result of practicing the art disclosed in the prior invention that came to light during subsequent testing, and that are disclosed in a subsequent invention by Zauderer on $NO_x$ control (U.S. Provisional Application No. 60/185,753, herein incorporated by reference in its entirety). Among the latter improvements are means to eliminate the overheating of the droplet injectors that inserted in the nominal 2000° F. combustion gas being treated for $NO_x$ reduction.

The combustion of these fossil fuels also leads to the formation of $SO_2$, and both pollutants lead to smog and acid rain over wide areas far removed from the combustion source, and it is especially a problem in urban environments. Sulfur is widely present in coal at concentrations ranging from less that 1% to well above 4%, in some oils, and in some natural gases and oils. It reacts with oxygen during the combustion process to form $SO_2$.

The $SO_2$ molecules that are formed during the combustion of a sulfur containing fossil fuel will react with calcium oxide particles dispersed in the combustion gas to form calcium sulfate, $CaSO_4$. The sulfur gas capture reaction is preceded by calcinations of the lime, $Ca(OH)_2$, or very fine limestone, $CaCO_3$, in the hot combustion gases to form a very porous, reactive calcium oxide, CaO, particle. Calcination is essentially complete at temperatures of about 1800° F. It is followed by reaction of the CaO particle with the $SO_2$ gas molecules. Depending on the particle size and its residence time at temperatures considerably higher than 2000° F., the CaO particle overheats and begins to fuse. This fusing effect closes its porous structure and sharply reduces the effectiveness of the $SO_2$ capture reaction. Furthermore, at temperatures substantially higher than 2000° F., the $CaSO_4$ reaction reverses and the sulfur is re-evolved from the particle as a gas. It is, therefore, essential to implement the calcination and sulfur capture reactions at the appropriate temperature. The droplet method disclosed in this invention for introducing $SO_2$ capture reactants results in a most efficient and low cost method of implementing these process steps.

By coincidence the reaction of urea or ammonia vapor molecules with the $NO_x$ that converts the latter to nitrogen, $N_2$, occurs under equilibrium conditions that overlap the temperature range of 1700° F. to 2200° F. at which the reaction of calcined lime or very fine limestone with $SO_2$ molecules is effective. Consequently, both processes can be implemented in the same apparatus. More importantly, the droplet method disclosed in this invention for introducing both NOx and SO2 capture reactants results in a most efficient and low cost method of implementing these processes.

While ammonia is somewhat more effective in reducing $NO_x$, and less costly than urea, ammonia's toxicity and handling problems, as well as its high vapor pressure which can result in vaporization of the ammonia in the aqueous feed pipe leading to the injector and resulting in an unsteady, fluctuating flow, makes urea the preferred material for the present invention There are a number of processes for removing $SO_2$ from stack gases. A widely used method in power plants that is very costly and that is generally called wet scrubbing, involves low (less than 500° F.) temperature scrubbing of the gas with a calcium oxide content aqueous solution that forms a sludge containing calcium sulfate. While this method removes well over 90% of the $SO_2$ even in high (4% or greater) sulfur coals, the equipment needed for this process is very costly, difficult to maintain and the resultant sludge must be dried in very large sludge ponds prior to disposal. In addition to removing almost all the $SO_2$ from the combustion gas, these low temperature processes convert almost all the calcium oxide to calcium sulfate, resulting in almost 100% utilization of the calcium. Beneficial use of the residual calcium sulfate as a gypsum construction material is hindered by the need to remove contaminants, such as ash from coal combustion. This further adds to the cost.

An alternative and much less costly process is to inject calcium carbonate, $CaCO_3$, or calcium hydroxide (namely, lime), $Ca(OH)_2$, as a fine powder, in the primary combustion zone of the boiler or downstream in the post combustion zone. The calcium carbonate or hydroxide is generally injected as a fine dry powder in either hot gas zones, as opposed to an aqueous lime or limestone mixture with water because lime or limestone has a negligibly small solubility in water. The particles first calcine to calcium oxide, CaO, at temperatures up to about 1800° F. This is followed by a heterogeneous CaO reaction with $SO_2$ to form $CaSO_4$. The equilibrium reaction proceeds up to a particle temperature of about 2000° F. Above this temperature, the reaction reverses and the $CaSO_4$ dissociates and re-evolves the $SO_2$ as a gas.

Zauderer (U.S. Pat. Nos. 4,624,191 and 4,765,258) has disclosed $SO_2$ capture in the combustion zone of a slagging cyclone combustor, where the mean gas temperature is in the 3000° F. range. This is 1000° F. above the equilibrium temperature for $SO_2$ capture. However, Zauderer's reaction takes place under non-equilibrium conditions. This means that the lime or limestone particles enter the combustion zone in the air and fuel injection zone, where they heatup and undergo rapid calcination in periods of the order of 10's of milliseconds. This results in a very porous particle having an internal surface area that is 100's to 1000's time greater than the outer surface area of the particle. The $SO_2$ gas diffuses into this porous CaO particle and reacts to form $CaSO_4$. Due to the short residence times of the calcium oxide particles in the slagging combustor injection zone, the particle temperature in this region is well below the local combustion gas temperature. It is the local particle temperature that determines the reaction rate between CaO and $SO_2$ and its direction, i.e. capture or re-evolution of sulfur dioxide, in the particle.

This non-equilibrium sulfur capture process is not effective in large boilers fired with conventional pulverized coal burners. In that case, when the lime or limestone particles are injected into the burner zone of the large boiler, the particle residence time is so long, namely periods of one or more seconds, that the particles are heated well beyond 2000° F. particle temperature at which the non-equilibrium sulfur capture reaction is effective, and they reach the 3000° F. combustion gas temperature. This heating causes "deadburning" of the calcium, namely, the pore structure closes and the effective surface area available for the heterogeneous $SO_2$ capture reaction is sharply reduced. Also, the CaO and SO2 reaction proceeds toward dissociation. One solution is to inject the particles in the lower temperature zone higher up in the boiler furnace, where the gas temperature has been reduced to 2000° F. and "deadburning" is suppressed. This latter method is suitable for boilers of all sizes. This later process is the one that is utilized in the present invention. For this process to be effective and efficient it is essential to disperse the lime or limestone particles throughout the gas temperature zone at which $SO_2$ capture is effective. This invention discloses a method for accomplishing the $SO_2$ capture effectively.

With the proper conditions, both the equilibrium and non-equilibrium sulfur capture processes yield high $SO_2$ capture. Zauderer has measured $SO_2$ reductions ("Demonstration of an Advanced Cyclone Coal Combustor, with Internal Sulfur, Nitrogen, and Ash Control for the Conversion of a 23 MMBtu/hr Oil Fired Boiler to Pulverized Coal" Coal Tech Corp., August 1991, NTIS Documents DE92002587 and DE92002588, also "Status of Coal Tech's Air-Cooled Slagging Combustor" in *Second Annual Clean Coal Technology Conference*, September 1993, NTIS Document Conf-9309152), ranging from 50% to over 80% with non-equilibrium injection into the primary combustion zone of a slagging cyclone combustor and with equilibrium injection in the downstream, post-combustion zone of the boiler furnace. However, in both processes, the amount of calcium utilization was low, ranging at best to about 33%. This means that these two processes require large amounts of reagent for utilization with high (more than 2 to 3% by weight) sulfur coal or other fuels such as petroleum coke, which is costly.

An additional drawback of the non-equilibrium $SO_2$ capture reaction is that although the capture reaction most probably takes place in the fuel injection region and air-fuel mixing region of the primary combustion zone, where the gas temperature is lower and where most of the fuel bound sulfur is released from the volatile matter in the fuel, the reacted sulfur bearing particles are then carried into the primary combustion zone where the gas temperature exceeds 3000° F. This will re-evolve the sulfur from the calcium sulfate particles as a gas. One solution to this problem in slagging, cyclone combustor is to drive the particles by centrifugal swirl of the combustion gas into the slag lined wall of the cyclone combustor. The particles dissolve in the slag. However, slag has a very low solubility to sulfur and the sulfur will revolve in a matter of a few minutes, unless the slag is continuously drained from the combustor wall. Therefore, this process is very specific to this type of slagging combustor, as disclosed by Zauderer (U.S. Pat. No. 4,765,258). This approach for $SO_2$ emission control is not suitable for boilers fired with conventional pulverized burners.

On the other hand, the injection of lime, or very fine limestone, using the equilibrium process for the reduction of SO₂ emissions is suitable for boilers of all sizes that use combustors of any type and that are fired by any sulfur bearing fuel, such as coal, petroleum coke, or high sulfur-heavy oil. This is the method that it is proposed for practicing the present invention. It involves injection into the furnace zone of the boiler, at a location where the combustion gas temperature is favorable for equilibrium sulfur dioxide gas capture reaction by calcium oxide or any other material that reacts with gaseous sulfur compounds, such as sodium compounds. As noted above ("Demonstration of an Advanced Cyclone Coal Combustor, with Internal Sulfur, Nitrogen, and Ash Control for the Conversion of a 23 MMBtu/hr Oil Fired Boiler to Pulverized Coal" Coal Tech Corp., August 1991, NTIS Documents DE92002587 and DE92002588, also "Status of Coal Tech's Air-Cooled Slagging Combustor" in *Second Annual Clean Coal Technology Conference*, September 1993, NTIS Document Conf-9309152), Zauderer has measured $SO_2$ reductions of up to 80% when injecting dry calcium hydroxide particles into the furnace region of a 20 MMBtu/hour boiler at a location when the combustion gas temperature was in the range of 2000° F. However, the calcium utilization was only about 25%, i.e. the Ca/S mol ratio was 4.

The major barrier that must be overcome to achieve efficient reduction of $SO_2$ and $NO_x$ is to assure that the two appropriate reagents intercept most if not all of the gas flow being treated. A solution similar to that proposed by Zauderer (U.S. Pat. No. 6,048,510) for nitrogen oxide reduction by urea or ammonia injection in the upper furnace region of a boiler is utilized in practicing the present invention. For the $NO_x$ reduction reaction, the gas temperature partially overlaps the range that is necessary to practice the present invention of $SO_2$ reduction. For $NO_x$ reduction, an aqueous solution of the reagent, urea or ammonia, is dissolved in water and atomized in a special injector that yields droplets of varying size that are then dispersed in the region where the $NO_x$ reduction reaction is effective in a furnace. The droplets vaporize at their surface toward their core. Therefore, the larger droplets penetrate deeper into the combustion gas before vaporization is completed. One can, therefore, design an injector to atomize droplets in a size range that will allow full coverage of the gas zone being treated, as described by Zauderer (U.S. Pat. No. 6,048,510).

This droplet injection method must be modified when adding $SO_2$ reduction because calcium hydroxide, i.e. lime, and very fine limestone have insignificant solubility in water. Injecting lime or very fine limestone as dry particles has several major disadvantages, which most probably accounts for the low calcium utilization with dry injection, as noted above. The mean size of calcium hydroxide particles is under 10 microns. As a result they are entrained in the gas stream being treated within a short distance from the injection point into the boiler and they do not penetrate throughout the gas zone being treated. This is especially the case in medium size (i.e. 100 MMBtu/hour heat input) and larger boilers. Utilization of a high velocity air jet may project them deeper into the gas stream being treated but it does not solve the problem of widely distributing the lime particles in the gas zone being treated. Limestone has a larger mean size in the 10 to 100 micron range. While the larger limestone particles project further into the gas zone, their larger size reduces the diffusion rate of the $SO_2$ gas molecules into their porous interior formed after calcinations of the limestone. It is widely known that limestone is not as effective as lime particles in sulfur capture.

Another problem with dry particle injection in large furnaces, such as utility boilers, is that the particles will calcine in a distance that is negligible small compared to the gas volume being treated. As a result, the probability of "deadburning", i.e. overheating of the calcined particles with resultant closure of the internal pore structure, is greatly enhanced. The present invention discloses a means whereby the above noted disadvantages are overcome and the reagent for the $SO_2$ reduction is introduced into the furnace in a manner that yields a most efficient result.

Almost all the tests that were conducted to reduce this invention to practice were implemented in a 20 million Btu/hour air cooled, cyclone combustor that contained most of the design features disclosed in Zauderer's patents (U.S. Pat. Nos. 4,624,191 and 4,765,258), both are specifically incorporated herein by reference in their entireties. The combustor was attached to a 17,500 pound per hour of saturated steam boiler manufactured by the Keeler Boiler Company, Williamsport, Pa. in the early 1970's. The key modifications to the design disclosed in said patents were to replace the refractory outlet, namely the exit nozzle, with air cooled pipes whose interior was lined with refractory ceramics held in place with metal studs that were welded to the pipes facing the inside of the combustor. This design is similar to that used in said patents for the main combustion chamber. These pipes were an extension of combustor air cooling pipes that lined the downstream section of the combustor and the cooling air was directed into a chamber that separated the combustor from the boiler to which is was attached. This chamber is identified as item 5 in FIG. 1 of this invention. As a result this additional air diluted the combustion gases exiting the main combustion chamber. In case the main combustion gases were fuel rich, this additional air flowing into chamber 5 would complete combustion. However, for the purposes of this invention, the stoichiometry in the primary combustion chamber was always fuel lean and the combustion gases leaving the primary combustion chamber always had an excess of oxygen.

Also, tests to develop the procedures for practicing this invention were conducted in a 50 MW electric output utility boiler.

Finally, it is to be noted that extensive references in the technical literature and patents exist on the injection of calcium based particles into the combustion and high temperature, 2000° F. and above, post-combustion zone of the furnace section in a boiler, either as a dry powder or a slurry. However, these references differ widely in the implementation of said process. Some of these differences appear to be minor but they can have major effects of the efficacy or cost of the method specific method or process. By way of example, Ashworth (U.S. Pat. No. 5,967,061) teaches the use of calcium oxide particles either in dry or in a coal water slurry form. However, it differs very significantly from the present invention in that the particles are injected in a combustion gas temperature range above 2400° F. Zauderer (U.S. Pat. No. 4,624,191) teaches that this high temperature range is only effective in a non-equilibrium reaction mode with the SO2, and in large furnace, the reaction will reverse when the particle reaches eventual equilibrium with this hot gas temperature. Ashworth also teaches the dispersion of the calcium oxide in a coal-water slurry that is injected into the post-primary combustion zone of a boiler furnace to effect said SO2 reduction. However, in reducing the present invention to practice, it was noted that as lime concentration exceeded 30% of the weight of the limewater mixture, it turned to a nearly solid sludge. Therefore, adding lime to a coal-water mixture, where the coal concentration, according to Ashworth, is from 40% to 65%, will turn the final mixture to sludge after a relatively small addition of lime. Also, Ashworth does not teach the importance of a wide droplet size distribution to disperse the injected particles, or for that matter the coal-water slurry throughout the gas temperature zone being treated.

Zauderer (U.S. Pat. No. 6,048,258) gives other examples how the droplet injection method used in that invention and in the present invention differs from other methods used to effect NOx reductions by the SNCR process.

SUMMARY OF THE INVENTION

The present invention discloses a method for the simultaneous reduction of the concentration of sulfur dioxide, $SO_2$, and nitrogen oxides, $NO_x$, in the products of combustion of a fossil fuel. The method consists of injecting liquid water droplets of varying size, containing smaller lime or very fine limestone solid particles uniformly dispersed in water, into the combustion gas stream. Specifically, the method disclosed consists of air atomized water droplet injectors that are inserted in the furnace of a boiler at the outer edge of a gas temperature zone in the range from about 1700° F. to 2200° F. Here the calcination of the lime or very fine limestone is followed by reaction with the $SO_2$ in the combustion gas to form calcium sulfate particles. The latter can be removed from the stack gas exhaust by a baghouse filter, an electrostatic precipitator, or a wet scrubber. Simultaneously, the vaporization of the urea or ammonia dissolved in these droplets will react with the $NO_x$ and convert it to $N_2$. The atomization produces droplets of varying size in a range that assures their vaporization throughout the combustion gas zone being treated. The dimensions of the boiler determine the optimum droplet size distribution. The lime or very fine limestone particles are substantially smaller than the droplets, and their size is minimized to achieve maximum utilization of the calcium in the reaction with sulfur dioxide. The droplet method disclosed in this invention for introducing $SO_2$ and $NO_x$ reduction reactants results in a most efficient and low cost method of implementing these processes.

The present invention includes a method of reducing the concentration of sulfur dioxide, $SO_2$, in an effluent gas stream from the combustion of carbonaceous fuel in a boiler or furnace. The steps include: identifying a gas combustion temperature zone within said boiler or furnace which ranges from about 1700° F. to 2200° F.; injecting an aqueous liquid into contact with an effluent gas stream in said gas combustion temperature zone within said boiler or furnace, said aqueous liquid comprises dispersed reducing agents consisting of solid particles selected from the group consisting of lime or very fine limestone or similar acting $SO_2$ reducing agents, with or without a surfactant and stabilizer chemical agent to aid in the suspension and dispersion of said solid particles in said liquid and said step of injecting being performed with at least one injector, said step of injecting being performed with a nozzle that forms a flat, planar, fan shaped spray pattern which is oriented perpendicular to said effluent gas stream and is off sufficient cross-sectional area to intercept all of the effluent gas flow in said gas combustion temperature zone; and producing droplets of a non-uniform variable size ranging from 10 μm to 1000 μm where a mean and maximum size of said droplets depend on dimensions of said furnace or boiler, said producing step taking place during said injecting step by varying hydraulic and air atomizing pressures in said injector in order to permit distribution and vaporization of different sized droplets at different locations within said combustion temperature zone, and adjusting a position of an injector droplet outlet of said injector within said boiler or furnace based on an outer edge of said gas combustion temperature zone identified in said identifying step, said adjusting step positioning said injector droplet outlet adjacent to said outer edge of said gas temperature zone identified in said identifying step.

The invention also includes a method of reducing the concentration of sulfur dioxide, $SO_2$, in an effluent gas stream from the combustion of carbonaceous fuel in a boiler or furnace, comprising the steps of: identifying a gas combustion temperature zone within said boiler or furnace which ranges from about 1700° F. to 2200° F.; injecting an aqueous liquid into contact with an effluent gas stream in said gas combustion temperature zone within said boiler or furnace, said aqueous liquid comprises dispersed reducing agents consisting of solid particles selected from the group consisting of lime or very fine limestone, or similar acting $SO_2$ reducing agent, with or without a surfactant and stabilizer chemical agent to aid in the suspension and dispersion of said solid particles in said liquid and said step of injecting being performed with at least one injector, said step of injecting being performed with a nozzle that forms a conical spray pattern which is oriented coaxial with said effluent gas stream and is of sufficient cross-sectional area to intercept all of the effluent gas flow in said gas combustion temperature zone; and producing droplets of a non-uniform variable size ranging from 10 μm to 1000 μm where a mean and maximum size of said droplets depend on dimensions of said furnace or boiler, said producing step taking place during said injecting step by varying hydraulic and air atomizing pressures in said injector in order to permit distribution and vaporization of different sized droplets at different locations within said combustion temperature zone, and adjusting a position of an injector droplet outlet of said injector within said boiler or furnace based on an outer edge of said gas combustion temperature zone identified in said identifying step, said adjusting step positioning said injector droplet outlet adjacent to said outer edge of said gas temperature zone identified in said identifying step.

One or more injectors may have an atomizing air chamber with outlets for said droplets and inlets for liquid and air and each of said one or more injectors are connected to a pressurized aqueous liquid, containing dispersed particles, filled pipe, and a parallel compressed air pipe, were said air pipe and liquid filled pipe are each placed inside and co-axially within a pipe containing water flowing at sufficient rates to prevent boiling at about atmospheric pressure of all said liquids in all the pipes and inside the droplets injector head which is placed in contact with the said hot gas temperatures. The outer water cooling flow pipes may terminate a slight distance upstream of said compressed air and solution dispersed particle filled pipes, thereby allowing the cooling water to exit the outer cooling pipes and cool the rear of the injector head by evaporative cooling, with the balance of the outer cooling water flow entering the furnace being treated and evaporating.

The outer water cooling pipe may be replaced with a high temperature insulating material consisting either of ceramic fiber cloth or ceramic cement coating surrounding the inner air pipe, and with said ceramic material being of sufficient thickness to maintain the inner air flow at a temperature low enough to prevent boiling of the inner liquid in the injector atomizing chamber.

The concentration of said solid particle reducing agent dispersed in the aqueous liquid can be as high as 30% by weight without the addition of surfactants or stabilizers, and where said particles are maintained in uniform dispersion in said aqueous liquid by continuous mechanical stirring or by continuous re-circulation with a pump of said liquid mixture in the several tanks containing said mixture, and, if necessary, by the addition of a surfactant and stabilizer chemical agent to aid in maintaining said uniform dispersion.

The injection rate of said reducing agent into said effluent gas stream being treated is at a mol flow rate that is at least one times greater than the mol flow rate of untreated gaseous sulfur dioxide in said effluent gas stream.

The injectors may be placed with their droplet outlet orifices into the hot gas flow being treated to a position at the outer edge of the combustion gas temperature zone, of about between 1700° F. and 2200° F., and where the droplets emerging from said injector or injectors are directed only into the entire gas flow region being treated at said temperature at which the efficient reaction of the chemical agent and the pollutant is favored, and where said injector droplet outlet orifices is moved either manually or by an automated control to remain at said outer temperature edge as said temperature edge changes due to changes in the boiler load.

The gas combustion temperature zone at which the said injectors are inserted may be determined by means of a thermocouple with a bare exposed tip that is inserted into said gas stream being treated, with said thermocouple tip being recessed within a ceramic tube where said ceramic tube is held in place in a hollow metal pipe, which is connected to a vacuum source that draws said hot gas into said ceramic tube to measure the gas temperature, and where said pipe is surrounded by an outer pair of pipes wherein flows cooling water to the end of said inner pipe containing the thermocouple wire and returns through the outer of said pair of cooling pipes.

The present invention may also include the steps of forming said aqueous mixture from a reducing agent in a powder form by delivering said reducing agent to said boiler or furnace by unloading said reducing agent from a supply tanker having bottom discharges suitable for discharge through a metering rotary valve or helical screw feeder to a pneumatic conveying eductor, with said eductor connected to a pipe conveying said chemical powder to a water tank, where said reducing agent is dispersed and mixed with water and maintained in uniform dispersion by continuous mechanical stirring, and, if necessary, by the addition of a chemical surfactant and stabilizer, and conveying said mixture by means of a submersible pump that maintains the prime to a high pressure centrifugal or progressive cavity pump to a second tank, with said second tank also containing a submersible pump that maintains a continuous prime to a high pressure liquid pump that re-circulates part of the flow to said second tank and feeds the balance of the aqueous mixture to said injector with said liquid and compressed air injection rates controlled by suitable flow meters, pressure gauges and valves.

The injector feed pipes to said injectors may each be cooled by an external, coaxial jacket pipe having flowing water, at a rate controlled by flow meters, pressure gauges and valves, and supplied by a gravity fed tank to maintain the cooling flow in the event of a power failure.

Still further, the invention may include the step of inserting said injector through pre-existing ports on said boiler or furnace.

The surfactant and stabilizer may be mixed in said aqueous mixture at concentration that are typically less than 1% by weight.

Hydraulic injectors may produce either a flat fan spray of a conical spray, depending on the boiler configuration and rating, are used in place of air atomized injectors.

Mechanical stirrers may preferably consist of one or more propellers placed at several locations along a shaft, with said propellers having an outer diameter that is at least one-third, and preferably more than one-half of the inner diameter of said tank containing said solid-liquid mixture, and with said shaft being rotated by a motor at a speed sufficient to induce high shear flow in said tanks.

The invention also includes small industrial boilers or furnaces where said liquid injectors are replaced by one or more externally insulated metal tubes containing said $SO_2$ reducing agent, such as lime, in dry powder form, and where said reducing agent is transported pneumatically in said metal tubes to the high temperature gas region in the range of 1700° F. to 2200° F. being treated for $SO_2$ removal, with the outlet of said tubes being inserted into the outer edge of the high temperature region of the boiler or furnace being treated.

The tubes may be placed coaxially with the flow direction of the gas being treated, with said tubes being equally spaced along a circle whose diameter is a large fraction of the diameter of the gas flow being treated, with the number of said tubes being selected so as to uniformly disperse said $SO_2$ reducing agent throughout the gas volume being treated.

The present invention includes intermediate or large boilers or furnaces where the outlet a of said one or more pneumatic conveying tubes are flattened into a narrow ellipse so as to inject said dry $SO_2$ reducing agent in a flat fan spray pattern that intercepts said gas flow being treated in a plane that is perpendicular to the hot gas flow direction in said boiler or furnace.

The invention also includes, in addition to said $SO_2$ reducing agent dispersed in an aqueous mixture, a $NO_x$ reducing agent consisting of ammonia or urea or ammonia precursor is added to and dissolved in said mixture, with said $NO_x$ reducing agent being added at a concentration such that the mol flow rate of the $NO_x$ reducing agent into the furnace or boiler being treated is equal to or greater than the mol flow rate of the NOx species in the hot gas flow being treated. The $NO_x$ reducing agent concentration may be about a factor five to ten lower in concentration than that of the $SO_2$ reducing agent.

The optimum placement of the several said injectors into furnaces or boilers of varying size can best be optimized by firing said furnaces or boilers with gas or oil or a low sulfur coal and adding sulfur powder through injection ports that are separate from the fuel injection ports in order to duplicate the higher $SO_2$ concentrations that are encountered in regular and extended furnace or boiler operation.

Sulfur powder may be mixed uniformly with another fine combustible powder material such as fine sawdust or low sulfur pulverized coal at a mixture ratio such that the feed rate of the mixture is sufficiently high to result in a steady and uniform injection rate into the furnace being evaluated for $SO_2$ reduction.

The high pressure, single or multi-stage centrifugal pump may be either attached to an electric motor of sufficient capacity to overcome the added power required to pump the higher viscosity aqueous lime mixture, or to an electric motor rated for operation with low viscosity water only that is driven by a variable alternating frequency electronic drive such that the motor speed is reduced to maintain the pump motor within its rated thermal limits.

The outer water-cooled pipe surrounding said aqueous mixture pipe may be eliminated and replaced with a ceramic insulating material and where further water is forced though said aqueous mixture pipe during insertion of said and removal of said injector in said boiler or furnace.

The startup and shutdown cooling water in said aqueous mixture pipe may be separated from said aqueous mixture flow by backflow check valve or by separate flow circuits to prevent the mixing of the two liquid flows.

The invention also includes a method whereby the optimization of the $SO_2$ and $NO_x$ reduction in coal fired furnaces or boilers is implemented economically and at much reduced heat input by utilizing oil and/or gas co-fired with aqueous ammonia and sulfur powder or sulfur powder mixed with a combustible fuel, such as sawdust, to produce $SO_2$ and $NO_x$ concentrations in said combustion gases that duplicate the concentrations with coal firing.

The simulation may be implemented in a cyclone combustor wherein the post-combustion zone is either in the downstream end of said cyclone combustor or immediately downstream of said cyclone combustor.

The present invention also includes a method in which a variable speed drive may be used control a direct current motor that is attached to a helical auger through which a powder or fine solid material is feed into a pneumatic feed duct, with said material flowing into said auger by means of a vibrator that is attached to the walls of the inverted V shaped box containing said powder or material.

BRIEF DESCRIPTION OF THE DRAWINGS

To clarify certain aspects of the present invention, the following drawings are appended to the detailed description of the invention:

FIGS. 1A and 1B are a side and rear view schematic drawings, respectively, of a 17,500 pound per hour package boiler to which a 20 million Btu per hour coal fired cyclone combustor is attached, and showing various placements of the fuel, sulfur, ammonia, combustion air, cooling air and aqueous lime and urea droplet injectors.

FIGS. 2A–G are schematic drawings of liquid droplet spray atomizers producing round and flat spray patterns, as well as a flat fan dry particle pneumatic injector. FIG. 2A shows a side view arrangement of parallel air and water feed pipes to the spray injector with external coaxial pipes containing cooling water for both the air and liquid feed pipes. FIG. 2B shows the outlet port for the round spray pattern from a single outlet port injector, FIG. 2C shows the outlet ports for the round spray pattern from a multiple outlet port injector. FIG. 2D shows the outlet port for a flat spray pattern injector. FIG. 2E is a side view of the atomizer showing the outlet spray pattern corresponding to that of FIG. 2C. FIG. 2F shows a side view of the flat fan particle injector and FIG. 2G shows the outlet view of said dry particle injector.

FIG. 3A shows a side view of the furnace and initial convective tube section of a large industrial or utility boiler, and FIG. 3B shows the cross-sectional view of the furnace section and the placement of the aqueous droplet injectors.

DISCLOSURE OF INVENTION

Figure 4:
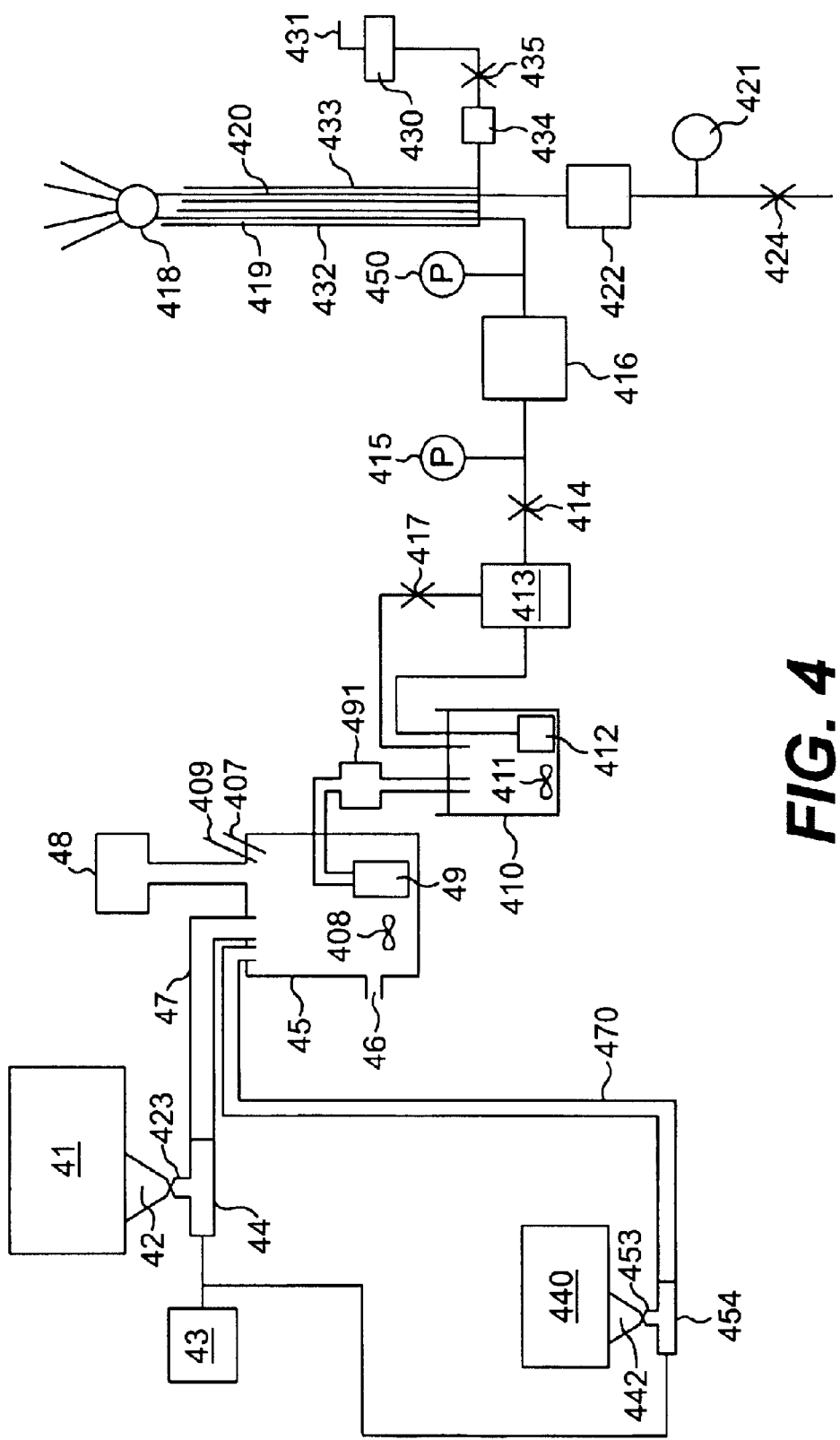
FIG. 4 shows a schematic drawing of one method for delivering the powdered lime or very fine limestone and the powdered urea, and preparing the lime or very fine limestone, urea, and water mixture in a tank from which the mixture is fed to the droplet injectors.

The present invention describes a method for optimally introducing chemical agents, preferably urea and lime or very fine limestone dispersed in aqueous droplets of varying size, into the combustion zone of a fossil fuel fired boiler. This will reduce the concentration of sulfur dioxide and nitrogen oxides in the combustion gas in a manner that assures the maximum utilization of the urea and lime, while eliminating or minimizing trace pollutants, such as ammonia or carbon dioxide from the effluent combustion gas stream exiting the boiler. It will also minimize both the amount of water utilized to convey the reagents and to cool the injection pipes and injectors. Injecting excessive cooling water into the combustion gas will affect the boiler performance by excessively cooling the hot combustion gases. Specifically, this invention addresses the very critical issue of assuring that the injected droplets containing the dissolved urea and lime or very fine limestone particles will be widely dispersed throughout the gas temperature zone at which the calcium oxide reaction with $SO_2$ and the urea reaction with $NO_x$ are effective with maximum utilization of the calcium oxide and urea.

Since it may not be feasible to reduce all the $NO_x$ to $N_2$ in the gas stream with this selective non-catalytic reaction process, SNCR, alone, this process may be practiced in combination with other $NO_x$ reduction processes, such as staged combustion using low $NO_x$ burners in dry ash coal fired boilers or entrained pulverized cyclone combustor boilers. Alternatively, this invention may be practiced in combination with a selective catalytic reduction, SCR, process to eliminate $NO_x$, although this step may not be economically desirable. Similarly, the process for the reduction of $SO_2$ in the gas stream can be practiced in combination with other $SO_2$ reducing processes. Other processes include the non-equilibrium reduction of $SO_2$ by means of injecting lime directly in the primary combustion zone of a slagging cyclone combustor, and/or reaction with lime deposited on the bags of a baghouse that remove ash particles from the gas stream exhaust, or by reaction in a low temperature scrubber containing an aqueous mixture of lime. With the exception of the external water cooling of the air and water feed pipes to the injectors, the other injection system design features needed to practice this invention for $SO_2$ control have many similarities to those described by Zauderer for the control of nitrogen oxides (U.S. Pat. No. 6,048,510).

The benefit in the selection of very fine limestone particles in place of lime is that the gas temperature at which the lime is injection, between 1700° F. and 2200° F., is sufficient to calcine the limestone. Since lime is commercially produced by the calcinations of limestone, including this limestone to lime conversion step in the present process eliminates the energy inefficiency and substantial added cost of external calcinations that is used to create commercial lime. However, to use limestone in slurry form it must be pulverized to approximately the same mean particle size as the lime, namely less than 10 microns. It reducing this invention to practice it was found that with conventionally pulverized limestone, whose mean particle size is about 10 times greater, the larger limestone particle rapidly settle in the water, even with the addition of surfactant that kept the smaller limestone particles in suspension. Since commercial lime is about 5 times more expensive than limestone, it outweighs the cost of finely pulverizing the limestone.

As noted above, one alternative of injecting coarse limestone into the primary combustion zone, such as disclosed by Zauderer (U.S. Pat. No. 4,765,258) and subsequently practiced in the 20 MMBtu/hour cyclone combustor, is substantially less effective than lime in reducing $SO_2$ in the primary combustion zone, much less so in the post-combustion zone. In addition to the problem of "deadburning" in the 3000° F. primary combustion zone, it is almost impossible to assure a wide dispersion of the calcined limestone in the nominal 2000° F. post-combustion zone.

With regard to the simultaneous use of these injectors for $NO_x$ and $SO_2$ reduction, it is noted that both the presently disclosed $SO_2$ and $NO_x$ reduction processes are effective in about the same gas temperature range of about 1700° F. to 2200° F. As a result by judicious preparation, combination, and introduction of both reagents it is possible to implement the combined $SO_2$ and $NO_x$ reduction in the same injectors inserted into the boiler gas stream. The urea or ammonia used to reduce the NOx will dissolve in water. Since calcium hydroxide, limestone, and other similar sulfur capture materials have negligibly small solubilities in water at ambient temperatures, it is necessary to maintain these particles in a dispersed state by continuous stirring and possibly in certain cases, such as very large mixing tanks, by the addition of a surfactant and stabilizer. Therefore, it is most efficient to perform the mixing as close to the boiler being treated as possible so as to eliminate the need for surfactants and stabilizers to maintain the particles in particles in a uniformly dispersed state.

While the description of this invention will from time to time refer to lime or very fine limestone and urea or ammonia as the reducing agents, by way of example, it will be understood that the reducing agents are not necessarily limited thereto, as it also is contemplated to encompass other compounds, such as those based on sodium, that react with and remove sulfur dioxide from combustion gases, and other ammonia based chemicals that react with and remove nitrogen oxides from the combustion gas.

The lime-urea-water mixture is pumped to the injectors that are inserted into the combustion gas in the boiler. Atomization of the droplets to assure a wide size distribution in the range of 10 to 1000 microns is preferably implemented with compressed air. Alternatively, hydraulic atomization could be used. However, hydraulic atomization yields substantially larger droplets, as much as a factor of ten, at the same pressure as with compressed air, which would be beyond the appropriate size range for dispersing the lime and urea throughout the furnace. Therefore, hydraulic atomization requires substantially higher pressures to yield the appropriate droplet size. This requires smaller injector outlets for the same aqueous mixture flow rates as with air atomization. The smaller the injector outlets, the more susceptible they are to blockage from the dispersed particles in the aqueous mixture. Therefore, the suitability of hydraulic atomization will be limited to special situations that are best established by testing in the boiler to be treated for $SO_2$ removal.

To achieve the most effective reaction between the calcium based particles and the $SO_2$ gas molecules, it is desirable that calcination of the calcium hydroxide or very fine limestone occurs as near as possible to the location of the CaO reaction with the $SO_2$ gas molecules. This is accomplished by injecting the droplets into a gas temperature zone in the furnace section of the boiler that is conducive to sulfur capture by the calcium compound particles, namely about 1700° F. to 2200° F. The solid calcium oxide particle size distribution will typically be 80% by weight less than about 10 micrometers in size for calcium hydroxide. On the other hand, the water droplets containing the dispersed particles will have a size distribution that is determined by the cross-sectional area of the boiler that is perpendicular to the combustion gas flow direction at the 1700° F. to 2200° F. temperature. In other words, the size of the droplet distribution will be selected so that the smallest droplets vaporize nearest to the injector while the largest droplets will complete their vaporization at the center of the cross-sectional area being treated.

As has been shown by Zauderer (U.S. Pat. No. 6,048,510) vaporization of droplets in a hot gas occurs by surface heating and boiling. Therefore, the depth of penetration of the droplets increases with increasing diameter. For a boiler rated at about 100 MW electric output, droplets in a size range from several 100 microns to 1000 microns are needed for these larger droplets to penetrate to the center of the furnace. In general droplets in the size range from 10 to 1000 microns will cover the cross-sectional area being treated in a wide range of boilers.

This surface boiling effect accomplishes the mission of introducing the dissolved urea and calcium particles that are dispersed inside the droplet at locations throughout the gas volume being treated in a manner that heats and calcines the particles as soon as they are released from the surface of the droplet. As they evolve from the droplet, they will be at maximum porosity and reactivity and will react immediately with the $SO_2$ molecules at that location. The particles that are initially at the surface of the droplet heat up first, while those at the center of the droplet will heat up last. Similarly, the urea is vaporized at surface of the droplet and dispersed in the hot gas. The size distribution of the droplets provides the additional mechanism for dispersing the urea and calcium-based particles and calcining them at the point of reaction with $SO_2$. This has the major advantage that the calcium particles are in the most favorable, highly porous configuration for sulfur capture as soon as they evolve from the droplet. This results in effective utilization of each calcium particle throughout the cross-section of the furnace at the most favorable temperature. This will reduce the calcium/sulfur mol ratio needed for $SO_2$ capture below the value of 3 to 4 that was observed by Zauderer in the post-combustion zone of the 20 MMBtu/hour combustor-boiler for dry particle injection in this temperature range. Similarly, the urea molecules will react with nitrogen oxide molecules as soon as they former boil off the surface of the droplet, thereby, assuring intimate mixing with the nitrogen oxide containing hot gas. This key point has not been noted in the references.

On the other hand, if the calcium particles were to be injected as a dry powder entrained in an air jet, they could indeed be carried with the injecting air jet deep into the interior of the furnace. However, turbulent gas mixing as well as radiative heating of the particles from the furnace walls and the hot gas would calcine the particles long before they reach the interior core of the furnace. This would minimize their porosity and reduce their effectiveness for reacting with the sulfur dioxide gas. Furthermore, it is very difficult to achieve a uniform distribution of particles throughout the cross-section of the furnace at the appropriate sulfur capture temperature even with a very large number of air jets.

The second key element of the present invention is that in medium and large size boilers the droplets are injected in a flat fan, approaching 180°, spray pattern using a flat plane injector. This type of air atomizing injector is similar in design to the Spraying System Company's (Wheaton, Ill.) Model SU 85 injector. This SU85 injector produces a flat spray of droplets having a mean size of several 100 microns. This spray pattern allows a nearly complete coverage of the furnace cross-section with a minimum number of injectors, typically, less than one-half dozen injectors for a 100 MW boiler. Hydraulic atomizing injectors, such as the McMaster-Carr Company's (Dayton, N.J.) Catalog 3404Kxx series, where xx are the digits for the different capacities available, also result in a flat fan spray of up to 120° included angle. Here the mass flow rate increases with increasing pressure and as noted the droplets are substantially larger than with air atomizing injectors operating at the same pressures.

By adding an outer water cooling annulus around the water and air delivery ducts to the injector head, it is possible to insert the injector head deep into the boiler furnace without boiling the aqueous solution in the feed pipe, an act that can produce steam in the feed pipe that effectively blocks the steady flow of liquid. Therefore, cooling of the feed pipes is an essential element in practicing this invention under conditions where the injector is inserted into the hot gas stream. The ability to insert the injector head into the hot gas stream provides great flexibility in assuring complete coverage of the droplets in the furnace injection zone. Alternatively, although less desirable from a reliability of injection point of view, it is possible to enclose the air and water feed pipes to the injectors with a a high temperature fiber ceramic cloth or ceramic cement.

The reason for inserting the droplet injector head into the hot combustion gas, to a distance of up to about 6 feet in a 100 MW utility size boiler, is that the gas temperature near the wall is 100's of degrees lower than in the central core. As a result, the reagents will not react effectively near the wall with the sulfur dioxide and nitrogen oxides, and it results in reduced calcium and urea utilization.

It is very important to note that it is preferred that both the air and aqueous mixture feed pipes are water-cooled. The air pipe must be cooled to prevent the air from being heated by the furnace gas conditions to above the boiling point of the aqueous solution. In that case, the hot air will turn the droplets into steam inside the injector head and negate the operation of the spray atomizer. The need for external cooling of the aqueous solution feed pipe is more subtle. One can design a particle-water mixture so that the flow rate of the mixture is high enough to maintain the temperature in the liquid feed pipe below the boiling temperature. This is the approach proposed by Zauderer in U.S. Pat. No. 6,048, 510. However, the cooling flow rate is determined by the heat transfer rate from the furnace gases and walls to the injection pipe. This rate may very well differ from the optimum flow rate for the water-reagent mixture. By adding a water-cooled outer annulus, the flow rate for cooling the water-urea-particle mixture and the flow rate for the water-urea -particle mixture can each be optimized independently. However, the decision on whether to enclose the feed pipes with water-cooling pipes or with ceramic cloth or cement is determined for each use based on an analysis of the heat transfer to the injector feed tube assembly.

Another aspect of the present invention is the need to maintain the calcium particles in suspension in the aqueous solution from the time the mixture is prepared until the time when the droplets are vaporized in the furnace. Due to the negligible solubility of calcium hydroxide or very fine limestone in water it is necessary to continuously stir the tank in which the mixture is prepared to achieve a uniform dispersion of the particles in the water. The mixing is accomplished by use of mechanical, motor driven mixers, such as propellers mounted on a motor driven shaft, and by continuously re-circulating the mixture with a high capacity pump.

In addition, the concentration of the particles must be kept low enough to prevent the formation of a highly viscous mixture that cannot be pumped and atomized. One means of assuring a uniform dispersion is to add a surfactant and stabilizer, an approach that has been widely used to prepare coal-water mixtures having up to 70% coal particle concentration by weight. These mixtures remain in suspension for extended periods measured in days, a condition that was necessitated by the need to ship the coal-water slurry to distant boiler systems. However, as uniform dispersion is only required from the mixing tank to the injector head in a boiler plant, the amount of surfactant and stabilizer needed, if any, will be far less than with coal-water slurry. Furthermore, the higher the concentration of suspended particles in the water, the more viscous and non-Newtonian the liquid mixture becomes. While 60% to 70% solid coal particle, coal-water slurries have been widely used and fed into air atomized burners, these high solids loading are not necessary for practicing the present invention, especially as the viscosity of mixture increases rapidly with solids concentration. In fact for lime concentrations in water in the low to mid-30% range, by weight, and higher, the viscosity of the mixture rapidly increases to the 1000's of centipoises range, which turns it into a sludge and thereby eliminates its use as a liquid for atomization. Furthermore, at such high viscosities, the type of pump suitable for this purpose, such as the progressive cavity pump, is very costly.

In reducing this invention to practice, mixtures of lime and water were prepared in concentrations ranging from 10% by weight of lime up to 50% by weight. Above a lime concentration by weight of about 35%, the mixture gradually became solid, even with the addition of a surfactant. The mixtures were prepared by using single or multiple motor driven rotating propellers, mounted on one shaft, and whose outer diameter was about ⅓ the inner diameter of the mixing tank. Three propellers were used in a 55 gallon tank. The propellers were attached at equally spaced locations to the rod that was connected to an electric hand drill rotating at about 500 revolutions per minute. The drill was manually moved around the mixing tank until a uniform mixture was obtained. This method yielded uniform mixtures having up to 30% by weight of lime. It was essential to produce very vigorous mixing, otherwise agglomerated lime particles of a size sufficient to block the injector ports would remain, which then had to be removed by passing the mixture through a screen, Consequently, uniform lime-water mixtures containing 30% by weight of lime could be readily obtained without the need of surfactants. Furthermore, even after the mixture stood quiescent for several days and the lime particle had settled toward the bottom of the mixing vessel, it was possible to rapidly recover a uniform mixture with the drill operated propeller. In other words, the lime particles did not re-agglomerate during this period.

Since the concentration of urea or ammonia will be less than 10% in almost all cases, these water soluble molecules will remain in uniform dispersion in the water with the procedures used for lime dispersion.

The effective viscosity of a 30% lime-70% water mixture produced by this vigorous mixing procedure had an effective viscosity of approximately 30 centipoises. This was deduced from a measured pressure drop of 4 pounds per square inch gage, psig, from 40 psig at the inlet of a ¾ inch internal diameter, 40 foot long hose to the hose outlet at the air atomizing-lime spray injector, through which the mixture flowed at 260 gallons per hour. This result was obtained by computing the friction factor from the pressure drop equation for laminar or turbulent flow in a circular tube, as is found in textbooks of fluid mechanics. The derived friction factor, f, was 0.234, which is in the laminar flow region. For laminar flow, the Reynolds number, Rey, can be derived from the relationship f=16/Rey, which yields a Rey of 68, which is far less than the value at which transition to turbulent flow begins at a Rey of about 2000. This effective viscosity is substantially less than the value of 1000 centipoises recently quoted by a gear pump manufacturing representative for a 30% lime in water mixture. The low effective viscosity is in agreement with Mark's Handbook of Mechanical Engineering (E. A. Avallone and T. Baumeister III, Marks Standard Handbook for Mechanical Engineers, $9^{th}$ Edition, McGraw-Hill, New York, 1987, page 14–15) which states that the effective viscosity of various single-phase, high viscosity fluids is between $\frac{1}{20}^{th}$ to $\frac{1}{50}^{th}$ of the value derived by standard viscosity measuring instruments.

In practicing this invention, the effective viscosity is the critical parameter, not the value derived from standard instruments, because it determines the flow rate and pressure loss of the lime-water mixture as it flows from the mixing tank to the injector at the boiler. This viscosity result has important implications in practicing this invention. If the effective viscosity were in the range of 1000 centipoises it would be necessary to utilize a positive displacement pump, such as a gear pump or positive displacement pump. The progressive cavity pump type was used with coal-water slurries, CWS, which have solids loading in the 50% to 65% range and viscosities in the range of several 100 to over 1000 centipoises. These pumps are much more expensive than centrifugal pumps in the pressure range of present interest, 25 psig to 50 psig. For example, a progressive cavity pump with a 200 centipoises viscosity fluid is limited to a low 235 revolutions per minute, rpm, and 35 psig increase per stage. Since ac motors generally operate at 3450 or 1725 rpm, costly reducing gears are required. This pump rated a 20 gallons per minute can cost as much as five times as that of a centrifugal pump of equal rating.

On the other hand, a centrifugal pump will generally operate at about 3450 rpm with direct ac motor drive. The higher viscosity of the lime-water mixture will increase the load on the motor. For example, when pumping the 30% lime-70% water mixture with a single stage 3 hp centrifugal pump, the electric power input was 30% greater than with water. To prevent overheating the pump motor, an oversize motor can be selected, or alternatively, a variable speed ac drive can be used to reduce the motor rpm. A 10% reduction in pump motor rpm reduces the power consumption by 27%, and the output pressure by 19%. In developing this invention, three different types of centrifugal pumps were used. They were: A single stage centrifugal pump, a jet pump, and a three stage centrifugal pump. The latter two pumps require an alternating current, ac, variable speed drive to maintain the factory installed motor below rated motor output power, while the single stage pump was operated at below its power capacity rating at the pump's design rpm of 3450. The jet pump was unsuitable for this purpose because at its rated rpm the pump motor power exceeded its rated capacity and overheated. An ac variable speed drive could not be used with this pump because it was driven by a single ac phase motor, which is incompatible with an ac drive.

Prior work in the open literature on coal-water slurries, CWS, can provide only limited guidance in specifying the characteristics of the water-particle mixture needed to practice the present invention. CWS are injected as droplets into the high temperature flame zone of a burner or combustor, which is somewhat similar to the present application. However, a very major difference is that in CWS combustion it is desired to confine the flame in a narrow zone near the slurry injection point. This requires small droplets with a narrow droplet size distribution. Furthermore, for the same size boiler, the CWS mass flow rates are very much greater than those required for the present invention. Consequently, it is essential to maximize the solids loading in the CWS, typically 50% to 65% solids by weight, to minimize the volume needed for multi-day fuel storage and transport. This in turn results in a high effective viscosity in range of 100's of centipoises, which requires the use of the more costly gear type pumps, such as progressive cavity pumps. On the other hand in the present invention, the solids loading of lime is limited to about 30%, which results in a much lower effective viscosity that allows the use of much less costly centrifugal pumps. In addition, in the present invention, the water-particle mixture can be prepared as it is being consumed, which reduces the required mixture storage space and reduces or eliminates the need for additives to maintain the solids in the mixture dispersed.

The droplet characteristics of water-lime slurries that are injected as droplets in low temperature stack $SO_2$ gas control systems used previously also do not require the wide particle size distribution of the present invention because the duct dimensions in the stack for the same size boiler are substantially smaller and the vaporization rate is also much slower.

This invention has been practiced at up to 30% lime solids concentrations without the use of additive surfactants and stabilizers. However, in practicing this invention in very large utility boilers in the many 100's of megawatt range, the quantity of liquid mixture to sustain the liquid feed rate into the boiler would be so high that the use of these additives might be required to keep the solids in suspension in the feed tank. In that case, the experience from CWS on the use of surfactants and stabilizers to maintain high solids concentrations of up to 65% may provide some guidance to the present invention. To obtain high solids concentrations, CWS is prepared with surfactants and stabilizers. J. L. Morrison, et.al. (reference below) reported on a typical surfactant used with CWS, namely an ammonium based sulfonated naphthalene condensate, marketed under the trade name Coalmaster A-23M by Henkel Corporation. It was found that its addition to the CWS in concentration of 1% by weight yielded the lowest viscosity, which minimized pumping power and droplet size. In addition to maintain the coal particles in suspension for many days, a stabilizer, Xantham Gum, marketed under the trade name Flocon 4800C. by Pfizer Corp., was used at concentration of under 400 parts per million to keep the particles dispersed in water. The same study reported that at 65% solids loading, the viscosity of the CWS was about 800 centipoise (cp), and it decreased to 200 cp at 55% solids loading. (The viscosity of water at 20° C. is 1 cp.) (J. L. Morrison, et.al "Preparing and Handling Coal-Water Slurry Fuels" in *Proceedings of the $18^{th}$ International Conference on Coal Utilization and Fuel Systems,* Clearwater, Fla., Apr. 26–29, 1993, pages 361 to 368, ISDN 0-936066-18-8. Also, K. D. Kihm, et.al. "Investigation of Dynamic Surface Tension of Coal-Water Slurry Fuels for Application to Atomization Characteristics" pages 637–648 in the same Proceedings, discuss additional surfactants that can be used.) It is understood that these references are selected as typical from the literature on CWS, and not as preferred for practicing the present invention.

Another key issue is the impact of the solids particle loading on the droplet size formed in the injector. As will be discussed below, practicing the present invention requires droplets in the 10 to 1000 microns. J. Ren, et.al (The Atomizing of DZ-Type CWS Atomizer" in *Proceedings of the $18^{th}$ International Conference on Coal Utilization and*

*Fuel Systems,* Clearwater, Fla., Apr. 26–29, 1993, pages 669 to 678, ISDN 0-936066-18-8) report that air atomization with multiple high pressure air jets impinging internally on the CWS flow in an injector resulted in droplets with 100 micron Sauter Mean Diameter, SMD, for viscosities of about 700 cp. It decreased to about 40 to 50 micron SMD for viscosities of about 200 cp. (SMD is the diameter of a drop having the same volume-to-surface area ratio as the ratio of total volume of all drops to the total surface area of all drops.) These mean droplets sizes, at much higher viscosities, are well below the mean size required to practice the present invention in large utility boilers, as discussed below. This means that the much lower solid particle concentration for practicing this invention, namely 30%, will yield the desired 10 to 1000 micron size range at lower pressure. Typically, pressures used for this invention have been in the range of 30 psig to 50 psig.

In summary, key differences between the present invention and CWS technology are as follows: Much lower liquid-solid mass flow rates in the present invention allow preparation of the mixture at the boiler site. Also, the reduced solids concentration in the liquid reduces the viscosity, the pumping power, and, for most applications, eliminates the need for additives to maintain the solids in uniform dispersion.

In view of the key importance of the droplet size distribution in practicing this invention, the key elements in the analysis for determining the droplet size will be briefly summarized. Further details are found in Zauderer (U.S. Pat. No. 6,048,510). The transport of droplets is governed by the equations of motion for a spherical particle subject to aerodynamic drag. The vaporization of the droplet in a hot combustion zone is governed by the convection, radiation, conduction, and boiling heat transfer relations as described in standard texts on heat transfer, [for example, see *Heat Transmission,* W. H. McAdams, (McGraw Hill, NY $3^{rd}$, Edition, 1954, or Heat, Mass, and Momentum Transfer, W. M. Rohsenow and H. Y. Choi (Prentice-Hall,Inc, Englewood Cliffs, N.J., 1961))]. To practice this invention, the water droplets are injected in the 1700° F. to 2200° F. combustion gas temperature zone of a boiler, where the CaO calcination and subsequent $SO_2$ reaction and the urea-$NO_x$ reaction are optimum.

The droplets, which are somewhat above ambient temperature when injected into the hot combustion gas, will remain in the liquid phase until the droplet's surface temperature reaches 212° F. The droplet is heated by convection and radiation from the gas (radiation from the wall can be generally neglected in large furnaces) as it traverses the hot gas. The rigorous analysis of the physical phenomena that the droplets undergo in the combustion gas involves extensive, but standard, heat and mass transfer analyses. However, it is possible to practice the present invention by examining the relative effects of the following phenomena:

The equation for convective heat transfer, Qv, to the liquid droplet, prior to its vaporization, is given $$Qv = h*A*(T \text{ gas} - T \text{ drop}), \text{Btu/time} \quad (1),$$

where T gas is the gas temperature, preferably 1700° F. to 2200 ° F., T drop is the water droplet's surface temperature, between ambient and 212° F., A is the surface area of the droplet, and h is the convective heat transfer film coefficient at the droplet surface. For a spherical droplet, h can W be computed from the dimensionless Nusselt number, Nu , which for small droplets of present interest is about equal to 2. The definition of the various dimensionless heat transfer terms are found in any heat transfer book, such as McAdams, cited above, and will not be repeated here. The film coefficient, h, computed from Nu, is inversely proportional to the droplet diameter, Dp.

In addition, the droplet is also subjected to radiation from the furnace walls and the hot gas. The wall radiation can generally be neglected compared to the gas radiation. Assuming a reasonable emissivity of 0.2 for the gas at a temperature of 2000° F., one finds that for droplets up to 100 microns the radiation contribution is less than 3% of the convective contribution. At 400 microns, it is 50%, while at 1000 microns it is 3 times greater than the convective term. However, this simplified analysis of the radiation term may well be an overestimate since water is highly transparent to visible radiation, and may even be transparent in the infrared.

The next issue that must be addressed in connection with the water droplets is the rate of penetration of the droplet's surface temperature into its interior as the droplet penetrates the combustion gas. Once the surface temperature reaches 212° F., the surface begins to boil. If the rate of penetration of temperature is extremely rapid, the droplet will most likely explode. Analytical solutions on the transient temperature penetration into a liquid or solid sphere are given in both McAdams and Rohsenow, cited above. The rate depends on two dimensionless numbers, the Fourier number, Fo, and the Biot number, Bi.

Fo is proportional to the thermal diffusivity of the water droplet and the time of penetration, and inversely proportional to the droplet radius squared. Bi is proportional to the product of the droplet radius and the combined surface convective and radiative film coefficient, h, as given above, and it is also inversely proportional to the thermal conductivity of water. Due to the low value of the thermal conductivity, the Biot number is equal to 0.1 when the contribution of radiation is negligible, and less when the radiation contribution is significant. In either case, the transient solution for spheres in the size range of 10 microns to 1000 microns as deduced from data curves in McAdams or Rohsenow, show that the surface temperature penetrates very slowly into the interior of the droplet. This is due to the low value of the water is thermal conductivity.

This is a very important result because it indicates that the vaporization of the droplet will proceed from the surface into the interior. Therefore, to assure wide distribution of the calcium-based particles that are dispersed in the water droplet, the water droplet size range should be large enough to allow maximum penetration into the proper temperature zone. This will also minimize the number of injectors required.

The next step in practicing this invention is to determine the time required to vaporize various size water droplets. This time may be estimated by computing the time required for the convective and radiative heat transfer to the droplet surface to boil the droplet, using about 1000 Btu/lb as the heat of vaporization. For droplets in the range from 10 microns to 1,000 microns, Table 1 in U.S. Pat. No. 6,048,510, shows that the vaporization time increases from 0.3 milliseconds for 10 microns to 92 milliseconds for 1,000 micron diameter droplets. As noted, since the vaporization appears to be a surface phenomenon, the calcium-based particles will be gradually dispersed into the gas stream as the particles evolve from the boiling surface of the droplet. This is opposed to the situation that would result from explosive vaporization of the entire droplet, as assumed by Ashworth (U.S. Pat. No. 5,967,061). For that to occur the entire droplets would have to rapidly reach 212° F., as would be the case if the Biot number had been much larger.

Having determined the heating process from the combustion gas to the water-lime droplet, the next step is to compute the fluid mechanic aspects of the droplet in the furnace gas stream. A sphere flowing through a gas stream is subject to a drag coefficient that is a function of the Reynolds number of the droplet in the gas. As given by Rohsenow, the drag coefficient decreased from 10 for a 10 micron particle, to 4 at 50 microns, to 2 at 100 microns, to 1.5 at 400 microns, to 0.5 at 1,000 microns. These values apply to droplets injected at 176 feet per second into 2000° F. combustion gases, which is a typical value for the injectors utilized to validate this invention in a 50 MW utility boiler.

Since the lime particles are uniformly dispersed in the droplet, it is necessary to assure that the acceleration of the droplets into the gas stream does not cause a redistribution of the particles inside the droplets toward one side. This would results in uneven evolution of the droplets into the gas stream. However, it can be safely predicted that this will not occur. In the first place, the measured size distribution of the lime particles shows that the average diameter is less than 10 micrometers. It can be readily shown that such small particles are rapidly, in a matter of milliseconds, entrained in a flowing gas stream. Therefore, the lime particles will remain dispersed in the water droplet, whose viscosity is at least ten times greater than that of high temperature gases.

To further clarify how to practice this invention, the same type of air-atomized injector that was used by Zauderer (U.S. Pat. No. 6,048,510) with urea-water droplets was also used in reducing this invention to practice. Specifically, air atomized, water droplet nozzles manufactured by the Spraying Systems Company, Wheaton, Ill. were used.

Zauderer (U.S. Pat. No. 6,048,510) showed that for a 17,500 lb/hr, saturated steam boiler, FIG. 1, manufactured by the Keeler Boiler Company in Williamsport, Pa. in 1970, one or two air atomized spray nozzles provide sufficient coverage of the combustion gas stream at the desired temperature for $NO_x$ reduction with urea. As indicated in FIG. 1A, a cyclone combustor 2 communicates with boiler 1 having furnace wall 12 and an exhaust 17 to the stack. The combustor 2 consists of two chambers. A primary chamber 3, where in accordance with well known practice, a pulverized coal is introduced through eight tubes 8 equally spaced along a circle in the end wall of 3 with sufficient primary (and any secondary) air 6 to partially or completely combust the fuel in chamber 3. Prior to introducing the coal, the refractory inner wall 100 of chamber 3 is pre-heated with natural gas or propane 7 to a temperature as high as 2000° F., at which coal ash mixed with limestone or lime will begin to melt. To minimize the gaseous fuel consumption during this heatup to less than 5% of the total rated capacity of the boiler, namely 20 MMBtu/hour, the wall pre-heat is accomplished without the introduction of the cooling air into co-axial pipes 101 that surround the outside of the refractory liner. Alternatively, or concurrently with the gas, oil can be introduced through a separate burner 9 that is inserted in the end wall of chamber 3 to fire the combustor. The oil firing rate can be adjusted from zero to the maximum 20 MMBtu/hr heat input.

An exit nozzle 4 is placed at the outlet of chamber 3 whose function is to re-circulate the combustion gases in chamber 3 in order to retain most of the ash as liquid slag and remove it through opening 111 in the floor of chamber 3 at its downstream end. The combustion gases pass through nozzle 4 into a second chamber 5 where the combustion gas temperature can be further lowered with additional air supplied by the outlet of some of the combustor and exit nozzle wall cooling tubes 101. The refractory inner walls of chamber 3, exit nozzle 4, and part of chamber 5 are cooled by air flowing through pipes 101, with part of this air re-circulated to stream 6 and the balance cooling air flow 11 exhausts into chamber 5. This airflow 11 into chamber 5 is also used for final combustion in case of fuel rich conditions in chamber 3.

In reducing the present invention to practice a novel test procedure was implemented which took advantage of the flexibility of this combustor-boiler system. The primary application of this invention is to the post-combustion zone of boilers that are fired with sulfur bearing fuels, primarily coal. In this zone, the reaction of the urea with the $NO_x$ and the calcined lime or limestone particles with the $SO_2$ in the combustion gas is most effective at gas temperatures in the range of about 1700° F. to 2200° F. To evaluate this invention, a combustion gas temperature range between 2000° F. and 2500° F. was produced in chamber 3 of the 20 MMBtu/hr combustor 2 (FIG. 1A) by using No. 2 oil in the burner 9 and adding sufficient excess air 6 to lower the final combustion temperature to this desired range. The oil feed rate was selected to yield total heat inputs into the combustor in the range of 8 to 10 MMBtu/hr. A K-thermocouple inserted through a port 14 in the roof of chamber 3 and protruding several inches into the gas stream yielded gas temperatures in the range of 2000° F. to 2300° F., which was in the desired range for effective reaction of CaO with $SO_2$. These conditions could not be achieved with coal 8 because coal combustion is very inefficient at such low gas temperatures, resulting in high levels of unburned carbon.

The much faster the rate of combustion of oil versus pulverized coal required some modification to the combustion procedure in order to achieve the desired gas temperature range in the lime injection zone either at the downstream end of the combustion chamber 3 or in the exit nozzle 4 or in the exhaust section 5. Typically at oil flame heat input of less than 10 MMBtu/hr and at excess air combustion conditions, the luminous, i.e. hot, part of the flame was confined to the upstream end of the 8 foot, long combustion chamber 3. As a result the downstream end of chamber 3 was below the desired 2000° F. gas temperature. Increasing this downstream temperature, i.e. to fill chamber 3 with a luminous flame, was accomplished by one of several methods. Either the amount of excess air was reduced, or additional solid fuel, such as wood sawdust was added through the coal injection ports 8 until the outlet of the exit nozzle 4 was luminous. This yielded a gas temperature as measured by a K-thermocouple at opening 14 of 2000° F. to 2300° F.

To reproduce the sulfur concentrations of 1% to 5% found in many USA coal in this gas stream, powdered elemental sulfur was pneumatically injected coaxially into chamber 3 through the coal injection ports 8 into chamber 3. This procedure yielded $SO_2$ concentrations in the stack 17 ranging between 2 to 8 lbs/MMBtu, which covers the range of most sulfur bearing coals in the USA. The sulfur was metered into an air blower driven, eductor from a variable speed, Model 600, 2 inch diameter, screw feeder, manufactured by the Accurate Company, Whitewater, Wis. Since the sulfur feed rate was below the minimum feed rate of this feeder, the 2 inch diameter, helix was at first replaced with smaller helixes of ¾ inch and 1 inch diameter. However, the powdered sulfur tended to form clumps that did not fill the small flights of the helixes evenly. An alternative approach of using a 2 inch helix with a 1 inch diameter solid shaft, forcing the sulfur through a wire mesh screen at the helix outlet, and bypassing part of the sulfur around the eductor inlet, solved the helix filling problem and the low sulfur feed rate requirement. However, this method limited the flexibility of varying the sulfur feed rate. The final solution was to mix the sulfur with fine sawdust, and feed the combined mixture into the eductor. This allowed the feeder to operate in its proper speed range while achieving the desired sulfur injection rates into the combustor.

Since No. 2 oil has little fuel bound nitrogen content and the gas temperature used in these tests was below the level at which thermal NOx is produced, the NO concentration in chamber 3 was artificially increased by injecting a 10% ammonia-water solution through one or two hydraulic atomizing nozzles injectors 181 inserted through openings in the upstream end wall of combustion chamber 3. The high gas temperature dissociates the ammonia and converts part of it into NO. This procedure increased the NO in the gas stream from less than 0.1 lb/MMBtu to a range of up to 0.5 lb/MMBtu.

The $SO_2$, $O_2$, NO, and CO concentrations in the combustion gas exiting the boiler 1 at the outlet 17 were measured about 10 feet downstream of the boiler outlet in the duct that connected the boiler gas exhaust to a baghouse that removed reacted and un-reacted calcium particles before the gas discharged to the atmosphere.

Since the $NO_x$ control with urea and ammonia procedures had been developed in connection Zauderer's $NO_x$ control invention, (U.S. Pat. No. 6,048,510) the majority of tests implemented to reduce this invention to practice were conducted with lime-water mixtures, and only a limited number of tests were conduced with a lime-urea-water mixture, to be described below.

With reference to FIG. 1, the lime-water mixture was injected into the combustion gas stream through various injector nozzles. Injector 16 was inserted through opening 14 in the downstream roof of combustion chamber 3. Injector 17 was inserted through the slag tap opening 111 on the downstream floor of the combustion chamber 3. Injector 151 and 152 were inserted through an opening 15 in the roof of transition chamber 5, and injector 153 was inserted though an opening 156 in the rear of boiler 1. The operation of these injector nozzles will be elaborated below.

With reference to FIGS. 2A and 2E, the injector nozzles consisted of an injector assembly 21 that contains a pressurized air pipe 22 and a pressurized aqueous-solid mixture pipe 23, which feed to the rear of an injector head assembly 210 that directs the compressed air and aqueous-solid mixture to an internal atomizing mixing chamber that has one or more spray outlets 25, 26, or 211 constituting one or more openings, depending on the spray patterns desired, such as shown in FIGS. 2B to 2D. In FIGS. 2A and 2E, the air pipe 22 and the aqueous-solid particle mixture pipe 23 extend side pipe side parallel to one another, and they are each surrounded by a coaxial and concentric pipe 28 for pipe 22 and 29 for pipe 23 through which cooling water flows in the direction of the internal air and aqueous mixture pipe and exits though an annular opening between the end of pipes 28 and 29 and the rear of injector head assembly 210. The resultant water spray 27 exiting through this gap, which is typically about ¼ inch in length, discharges into and vaporizes in the combustion gas in the furnace and it also impinges on the rear of assembly 210, thereby evaporatively cooling it.

A further advantage of the external water cooling approach disclosed for the air and liquid feed pipes is that in the event of electric power cutoff to the pumps that feed the aqueous solution or mixture into the injector, cooling flow can be maintained by a simple gravity feed which will prevent warping or damage to the either the liquid or air feed pipes. This arrangement is explained below in connection with FIG. 4.

However, an alternative that was found to function satisfactorily in the 20 MMBtu/hr combustor testing was to wrap the air cooling pipe with a high temperature cloth and to rely on the water-lime mixture flow to maintain the mixture flow below its boiling point prior to exiting the spray nozzle. With sufficient high temperature cloth insulation this procedure was also found to function properly in a utility boiler.

The aqueous-solid mixture containing the reducing agent (not shown) i.e. lime or very fine limestone particles, mixes with the high pressure air in a chamber inside injector head assembly 210 of FIG. 2E, then is discharged from injectors 16, 17, 151, 152, and 153 in FIG. 1 as atomized liquid droplets 24 in FIG. 2A. The injectors, 16, 17, 151, 152, and 153 are thus two-fluid atomizers. Although not shown, assembly 210 consists of several stainless steel components that are sealed with copper gaskets. The cooling water 27 as well as the aqueous-solid mixture 23 assures that this entire assembly can withstand insertion in the nominal 2000° F. combustion gas stream in the boiler.

In any event, the droplet laden air 24 flows out of chamber 210 and into either the downstream end of chamber 3 or into exit nozzle 4 or transition section 5 in FIG. 1 where it intercepts the combustion effluent gas stream at the optimal temperature for the reduction reactions (e.g. between 1700° F. and 2200° F.). The spray pattern developed depends on the outlet design of the atomizer. One spray pattern is a round spray in which the droplet laden air exits from a single orifice 211 out of the mixing chamber 210, as shown in FIG. 2B. This produces a very narrow spray angle α in FIG. 2A. A wider spray angle α can be achieved by using an outlet consisting of a series of orifices 25 placed equidistant at an angle β of 70° to the nozzle axis ↓-↓, in FIG. 2E. Both spray patterns were used in prior tests in the 17,500 lb/hr steam boiler, (Zauderer, U.S. Pat. No. 6,048,510).

In reducing the present invention to practice in the combustor-boiler of FIG. 1, the conical spray pattern 24 of FIG. 2A produced by outlets 25 of FIG. 2C and the single spray pattern produced by outlet 211 of FIG. 2B was used in injector 151, with the conical spray patterns 19 facing into the exit nozzle 4 in FIG. 1, and in injector 153 with conical spray pattern 154 facing into chamber 5 of FIG. 1. Separate tests were conducted with the flat plane spray patterns produced by injector outlet 26 of FIG.2D, using injectors 16 and 17 with flat fan spray pattern 18 of FIG. 1, perpendicular to the gas flow axis in chamber 3, and injector 152 with flat fan spray pattern 161 of FIG.1, perpendicular to the gas flow axis in chamber 5.

In reducing the prior invention (U.S. Pat. No. 6,048,510) and the present invention to practice in the 20 MMBtu/hour boiler shown in FIG. 1, the assembly 210 of FIG. 2, with outlet configurations 25 of FIG. 2C, 26 of FIG. 2D, and 211 of FIG. 2B, provided by the Spraying Systems Company, were used. In the prior invention (U.S. Pat. No. 6,048,510) and for most of the initial tests for the present invention the ¼-inch air atomized spray setups were used. Specifically, for outlet configuration 211 Spraying Systems model setup No. SU22 or the double flow capacity model SU42 was used. For outlet spray pattern 25 model setup SU29 or the higher capacity model SU46 was used. For outlet pattern 26, model setup SU23 or the higher capacity SU43 was used. These nozzle spray setups were each connected to the model ¼ JBC injector body, which consists of a rear air inlet for pipe 22, and a rear aqueous mixture inlet 23 with a ¼ inch NPT pipe thread. The SU22 produces a narrow spray 24 of included angle α as shown in FIG. 2A through one exit orifice, while the SU29 produces a wide-angle spray 25 through six exit orifices placed equidistant on a circle that is at an angle β of 70° to the injector axis. Model SU23 produces a flat fan spray pattern.

The liquid orifices in these ¼-inch injectors were so small that they were subject to blockage by random oversize lime particles. Consequently, larger ½ inch injectors, that were used in up to 100 MW electric output utility boilers tests, were used in subsequent tests in the 20 MMBtu/hr boiler tests. The blockage problem in the ¼ inch injectors was partially solved by filtering the lime-water mixture through a fine wire mesh screen prior to use and by limiting the lime concentrations in the mixture to less than 20% by weight.

However, after an improved mixing procedure was developed that enabled the lime concentration to be increased to 30% by weight without the use of additive surfactants or stabilizers, the ½ inch Spraying System air atomizer injectors were used exclusively in the final tests in the 20 MMBtu/hour boiler. Two injector designs were used. One was the single droplet outlet 211 of FIG. 2B with the model SU82 air-atomizing unit, attached to the model ½JBC assembly. The other was the six-droplet outlet 25 of FIG. 2C of model SU89. These injectors yield liquid flow rates up to 220 gallons/hour at air pressures of 54 psig and liquid pressures of 55 psig. This is about 5 to 7 times greater than achievable as similar pressures in the ¼ inch units. The ½ inch, ½JBC injector assembly with model SU85 flat droplet spray outlet 26 of FIG. 2D was used in practicing the prior NOx control invention (U.S. Pat. No. 6,048,510) in utility boilers rated up to 100 MW electric output. As described below this flat spray SU85 injector was used in reducing the present invention to practice in tests on a 50 MW electric outlet utility boiler.

According to the Spraying Systems Company in laboratory tests injecting into ambient air conditions, nozzle setup SU22 produces a 9 inch wide spray pattern 24 inches from the outlet orifice (about 20° included angle), with 40 psig air and 30 psig water, SU29 yields a 13 inch wide spray at only 15 inches from the outlet (about 50°) at 42 psig air and 20 psig water. In both cases, the spray pattern further widened at a very small angle, reaching a maximum penetration of 20 to 30 feet. The mean water droplet diameter for the SU29 nozzle was 30 microns at 46 psig air and 30 psig water, and it increases linearly on a semilog plot to 70 microns as the air pressure is lowered to 20 microns. At higher air and water pressures, the droplet size decreases. For example, at 85 psig air and 60 psig water, it is only 19 microns. The conical spray pattern of the SU29 nozzle setup was found by Zauderer (U.S. Pat. No. 6,048,510) to produce higher $NO_x$ reduction. In initially reducing the present invention to practice, the SU29 nozzle would be inserted in chamber 5 as injector 151 to produce conical spray 19 into the axial gas flow direction.

The flat spray pattern from SU23 produces, according to Spraying Systems, a 17 inch-wide spray at 15 inches from the nozzle outlet. This yields an included angle of about 60°, not much greater than the conical spray SU29's of 50°. Placement of injector 155 on the gas flow axis results in a spray pattern 19 that extends over a depth in the gas flow direction of about 15 inches before intercepting the exhaust from exit nozzle 4.

On the other hand, the flat plane spray injector 152, using a model SU23 or SU43 atomizing spray was inserted in chamber 5 of FIG. 1A to produce a flat fan spray 161 transverse to the gas flow direction. This is an alternative means of introducing the droplet spray into chamber 5 in a manner that intercepted the entire gas flow leaving the 17-inch diameter, exit nozzle 4. This diameter equals the flat spray width of 17 inches. In this case, the injector assembly 210 is placed at the outer edge of the gas zone being treated. The test results with these two injector placements will be briefly described below.

Finally, a ¼ inch SU46 wide angle conical spray injector 153 was inserted through the rear of boiler 1 through port 156 to produce a spray pattern 154 in chamber 5.

While reasonable $SO_2$ reductions were measured with these small ¼ injectors inserted in chamber 5, measurement of the gas temperature in chamber 5 showed that it was below the 1700° F. lower limit of the preferred temperature range when firing the combustor with oil and sulfur powder seeding. Consequently, the injectors were placed at the downstream end of the main combustion chamber 3, where the measured gas temperature was at or above 2000° F. Two flat plane injectors 16 and 17 using the model SU23 or SU43 atomizing spray were inserted through ports 14 and 111, respectively, to produce a flat fan spray 18, transverse to the gas flow axis. This spray pattern intercepted a large part of the cross-sectional area of the combustion gases in the 30 inch diameter combustion chamber 3.

It is noted that in coal fired application, the injectors would be placed in chamber 5 which would have the appropriate gas temperature for the $SO_2$ reaction with CaO. However, in the test using oil firing, the appropriate injector insertion locations are either in the downstream end of chamber 3 or into exit nozzle 4 of FIG. 1.

For large industrial and utility boilers, the appropriate region for treating the $SO_2$ with the present invention will generally require a flat fan spray pattern that is perpendicular to and intercepts the hot combustion gas flow. In this case, the water droplet laden air is discharged through a narrow slit 26 cutting the entire outer hemispherical dome of the water-air mixing chamber of FIG. 2D. This produces a flat, fan like spray pattern that can widening to almost 180°, several feet downstream of the injector outlet by assuring that the width of the slit extends into the air-water mixing chamber. This is not the case for the spray nozzles supplied by Spraying Systems Co. As noted the SU 23 diverges to about 60° at a distance of 15 inches from the injector outlet because the cut 26 of FIG. 2D contracts sharply toward the inner air-water mixing chamber. For larger injectors that are suitable for large boilers, such as Spraying System's flat fan spray model SU85, the included divergence angle is about 120° within 27 inches from the injector outlet. This has been found acceptable in testing Zauderer's invention (U.S. Pat. No. 6,048,510) that used this spray injector in several $NO_x$ control tests in large utility boilers of up to 100 MW. The SU85 is placed in a ½JBC body having ½ inch NPT pipe thread inlets in the rear for the water and air flows. Another nozzle setup, SU89, has the same water injector, but replaces the wide-angle flat spray outlet orifice, with the same six hole circumferential design as in the smaller SU29 nozzle. For these larger droplet injectors the spray pattern is sharply different for the two injectors compared to the smaller ones discussed above. At 44 psig air and 35 psig water pressures in both nozzles, the spray pattern for the round pattern SU89 nozzle is a cone that is 29 inches in diameter at 27 inches from the nozzle exit (equal to about a 60° included angle), while for the presently preferred SU85 nozzle it is 85 inches wide (equal to about 120° included angle, or double that of the SU23 flat plane nozzle). The length of the spray with the SU85 in ambient air tests by Spraying Systems was 13 to 20 feet, increasing with air and water pressure. Therefore, to practice this invention in large utility boilers, the latter nozzle is selected because the flat nozzle spray is inserted into the boiler in a plane perpendicular to the combustion gas flow direction, where it intercepts the widest possible gas flow. Droplet size tests by Spraying Systems under ambient air conditions for the SU89 showed mean droplet size increasing from 120 microns at 40 psig air and 30 psig water, to 500 microns at 30 psig air and 30 psig water. As per the following discussion in connection with Table 1, this mean droplet size is appropriate for large utility boilers.

It is noted that the Spraying System's air cap that produces the above spray patterns is only cut open to 180° on the external outlet side of the hemispherical dome. On the internal side of the dome the opening is less than 180°. By additional opening of the internal outlet 26 of FIG. 2D it should be possible to approach the 180° wide flat fan spray. For practicing the present invention, it is preferred to widen the internal air cap outlet opening to as close as 180° to achieve the widest flat spray possible.

Spraying Systems has also measured the accumulated volume percentage for these droplet injectors. For example, for the nozzle SU82, which has the same water flow rate as the SU85 but uses a single outlet 211 of FIG. 2B for the entrained droplets, 50% of the accumulated volume above the mean diameter, had diameters which increased from the mean diameter to a maximum of 145% greater than the mean diameter. The droplets below the mean diameter decreased much more sharply, decreasing to one third of the mean size. Furthermore, only 10% of the volume was between 33% and 58% of the mean size. These droplet characteristics are of some importance in practicing this invention. This means that the injector must be placed at the outer boundary of the appropriate gas temperature region being treated, and the injector head must be moved nearer and further into the furnace as this temperature changes due to load changes in the boiler. At too low a temperature the injected lime will not calcine properly or react effectively with the $SO_2$. Similarly, the urea or ammonia will not react effectively with the NO at these lower temperatures. As a result the calcium and urea utilization will decrease.

Field tests by Zauderer (U.S. Pat. No. 6,048,510) showed somewhat higher, (about 20% higher), water flow rates than the published values by Spraying Systems for specific air and water pressures. Consequently, the mean particle diameters must be measured for each specific application by commercial instruments designed for this purpose. The droplet sizes are measurable by a method described in U.S. Pat. No. 4,719,092 to Bowers, which teachings are incorporated here by reference. Alternatively, one can adjust the air and aqueous mixture pressures by trial and error to achieve the droplet size that yield the highest $SO_2$ reduction.

As noted above, the ¼ inch, spray atomizers, such as flat fan spray SU43, or six outlet conical spray SU46, or single outlet SU42, were very susceptible to plugging of the liquid passages by agglomerated lime particle. This occurred even at lime concentrations as low as 15%. This was partially corrected by manually screening, through a wire mesh, the lime-water mixture before use. However, such screening was not practical for the preferred 30% lime mixture, which, as noted, was preferred because it minimized the energy consumption needed to vaporize and heat the water to 2000° F. Consequently, as part of reducing this invention to practice, the large ½ inch, ½JBC injectors were also used in later tests in the 20 MMBtu/hour boiler. Specifically, the model SU82, which produces a single outlet spray 211 of FIG. 2B or the SU89, which produces a wider conical spray 25 in FIG. 2C were inserted as injector 151 through the opening in the roof of chamber 5 in FIB. 1A to produce spray pattern 19 into the upstream axial gas flow direction of the exit nozzle 4 of FIG. 1A. The outlet of the injector was placed on the axis of the combustor at a distance of a few inches downstream of the exit nozzle outlet 4.

The spray pattern 19 was much larger and wider with the ½ inch injector than with the ¼ inch injector. For the single outlet SU82, the width of the spray jet as given by Spraying Systems for ambient air conditions is an average of 10 inches, 27 inches downstream of the nozzle outlet. The combustor exit nozzle 4 in FIG. 1A is 24 inches long. Therefore, by placing the SU82 a few inches downstream of the exit nozzle 4, the spray will theoretically cover 35% of the cross-section of the 17 inch diameter exit nozzle at its upstream end, i.e. at the exit plane of combustion chamber 3, which is about 27 inches from the SU82 nozzle outlet. On the other hand, according to the Spraying Systems Company catalogue (Catalogue Number 55, page D-17) the six outlet spray nozzle, SU89, produces a conical spray between 21 and 26 inches in diameter, depending on the air pressure, 18 inches downstream of the nozzle outlet, and 29 to 36 inches in diameter, 27 inches from the nozzle outlet. As such, a significant part of this conical spray pattern will impact the 17 inch diameter, 24 inch long, exit nozzle wall 4, resulting in lime deposition on the wall.

It would be preferred to utilize a spray injector of intermediate size between the ¼ inch and ½ inch units for small boilers, such as the 20 MMBtu/hour unit, and an appropriate size injector can be designed and fabricated for those skilled in the art. However, for the purpose of reducing this invention to practice the larger SU82 and SU89 atomizers were used in the 20 MMBtu/hour combustor of FIG. 1. A qualitative proof of the effectiveness of these injectors in intercepting the gas flow leaving the exit nozzle 4 of FIG. 1A was the observation that operating the SU89, with its six outlet pattern 25 of FIG. 2C, at a high lime-water mixture flow rate of about 200 gallons per hour (gph) resulted in the droplet mist completely obscuring the luminous flame in the exit nozzle when viewed through observation port 156 in the rear of boiler 1 in FIG. 1A. Visibility of the luminous flame was re-established at flow rates under 100 gph. On the other hand, with the single outlet injector, 221 in FIG. 2B, the luminous flame in the exit nozzle was always visible over the range of liquid flows attainable with the injector. These two results confirm that the single outlet injector did not intercept the entire gas flow, while the six outlet injector encompassed an area greater than that of the exit nozzle. Since there is no outlet opening in the center axis of the six outlet injector, the loss of lime to wall impact also reduced the lime utilization rate. The resultant $SO_2$ reduction with these injectors will be discussed below.

While the details of the droplet sizes and dispersion in the hot gas flow are not as critical in small boilers, they are very important for large utility size boiler where it is essential to project the droplets across the entire cross-section of a large furnace. For the purposes of practicing this invention, the volumetric airflow and air pressure at the mixing chamber outlet of the atomizing injector can be utilized to compute the initial velocity and momentum of the mean water droplet exiting the injector. The mean particle diameter can be obtained by measurement or from nozzle manufacturer's data. From the aerodynamic drag on the particles, the initial force slowing the particle is computed. From Newton's Second Law of Motion, one can approximately obtain the time required for the particle to lose a fraction of its initial momentum, for example 10%, while ignoring mass loss due to vaporization. For the SU85 nozzle at 40 psig air pressure and 30 psig water pressure, 3 gallons per minute water flow is obtained at 17 acfm air flow, where "acfm" is the air flow in cubic feet per minute (cfm) at the actual (a) air temperature and pressure. This yields an estimated outlet velocity for the air and water droplets of 176 ft/sec, which is almost twice the value given for these pressures in the Spraying Systems Co. Catalog No. 55. Table 1 shows the computed time for boiling (i.e. vaporization) of water droplets ranging from 10 microns to 1,000 microns; the time for these droplets to lose 10% of their injection momentum in the hot combustion zone, without consideration of mass loss due to boiling, the distance the particle will travel in the hot gas while losing 10% momentum; and the ratio of 10% momentum loss time over boiling time.

The table shows several key results needed to practice this invention.
1) Droplets under 100 microns are unsuitable for large utility boiler because they penetrate less than 2 feet, while losing much of their liquid mass to vaporization. When including the mass loss due to vaporization the depth of penetration will be even less. Since a typical 100 MW boiler is 20 to 40 feet wide, depending on design, numerous injectors would be required and the injector heads would have to be placed at various distances from the inner furnace wall deep inside the furnace chamber to obtain complete coverage of the area being treated.
2) Droplets in the size range from about 400 microns to 1000 microns are suitable for large boilers of 100 MW and above. In this size range, depth of penetration is many feet with moderate mass loss due to boiling. Note that the large mass loss at 1,000 microns is due to the dominant contribution of the radiative heat transfer term. However, due to the transparency of water, this effect is most probably overestimated.

A more rigorous analysis of the water droplet behavior can be made, which would include the mass loss due to boiling. However, since the droplet mean diameter can be readily changed by changing air and water delivery pressure, the optimum droplet size can be best determined by testing in the boiler of interest.

Note that width and depth of penetration is more important in large utility boiler because the nozzles can economically only be inserted in existing openings in the boiler wall. This means that the droplet spray patterns must be transverse to the gas flow direction, and it is the reason why a fan spray pattern is disclosed as the most effective means of intercepting as much of the gas flow as possible. The specific size of injector depends on the boiler size and configuration. As such all three spray patterns shown in FIG. 2 may be applicable to specific boilers. For very large boilers, typically rated above 100 MW electric output, the 1 inch injectors such as Spraying Systems Models SU152 which has the outlet of FIG. 2B, or SU159 which has the outlet of FIG. 2C, or SU155, which produces the flat fan pattern of FIG. 2D, may be suitable, depending on the boiler design and injector insertion location. However, it is most probable that the flat fan pattern of FIG. 2D, injected transverse to the combustion gas flow velocity will be most appropriate. The SU152, SU155, and SU159 require the use of a 1JBC injector assembly, which has a 1 inch pipe diameter inlet each for the air and water flow. In using the single outlet or six point outlet injectors in boilers of similar design as the 17,500 lb/hour unit of FIG. 1, the injector would be inserted through the boiler walls with the nozzle pointing into the direction of the gas flow, as shown for the 17,500 lb/hr small boiler with injector 151 of FIG. 1. However, this would require insertion of numerous injectors deep into the boiler with consequent much increased risk of local overheating of the air and water feed pipes, and blockage of the nozzle outlets by the fly ash in the combustion gases. Consequently, the preferred practice of this invention in large boilers is to insert several flat fan spray injectors transverse to the gas flow direction, with a number sufficient to cover the proper gas temperature zone cross-section for the calcium oxide-sulfur dioxide reaction and the urea-nitrogen oxide reaction, and with a droplet size in the many 100's of microns to assure wide distribution of the urea molecules and the calcium oxide particles in the gas stream. As noted for 100 MW boilers and somewhat larger, the ½JBC injector assembly with the Spraying System's model SU85 flat spray injector is preferred, while for even larger, multi-100 MW boilers, the 1JBC injector assembly with the flat fan spray pattern injector SU155 is preferred.

In Table 1, the following headings are used: the water droplet boiling time, (T boil), the time for particle loss of 10% of injection momentum, (T mom), the droplet penetration distance for this 10% momentum loss as applied to various indicated sizes of water droplets. Also shown is the relative time for 10% momentum loss to total boiling time of the particle (Tmom)/Tboil),

TABLE 1

| Particle Dia., (microns) | T boil, (sec) | T mom, 10% loss, (sec) | Distance for 10% mom.loss, (ft) | (Tmom)/ Tboil), (%) |
| --- | --- | --- | --- | --- |
| 10 | 2.94 E-4 | 2.41 E-4 | 4.24 E-20 | 82 |
| 50 | 7.20 E-3 | 3.02 E-3 | 5.32 E-1 | 42 |
| 100 | 2.85 E-2 | 1.27 E-2 | 2.24 | 45 |
| 400 | 4.00 E-2 | 8.50 E-3 | 1.5 | 21 |
| 1000 | 9.20 E-2 | 6.03 E-2 | 10.6 | 66 |

As noted above, in a 100 MW or larger boiler, the combustion gas temperature within several feet of the inner furnace wall of the boiler is colder than in the central core. Therefore, to practice the present invention, it is necessary to insert the injector nozzle into a zone of gas temperature of about 1700° F. to 2200° F. For large utility boilers there are several regions that may have this temperature range, depending on the boiler design and operating conditions. The latter change as the load on the boiler changes. These regions are shown as 36 and 311 in FIGS. 3A–B for the 100 MW boiler used in tests in Zauderer's invention (U.S. Pat. No. 6,048,510).

An alternative to an air atomized droplet injector, such as shown in FIG. 2, is a hydraulic injector. In the latter, droplets are produced by the liquid pressure in the injector head. There are two disadvantages to hydraulic injectors. One is that droplets are substantially larger than with air atomization for the same feed pressure. Also the droplet diameter increases substantially as the liquid flow rate increases. Therefore, for the same flow rates, hydraulic atomizers yield much larger droplets than air atomizers. Therefore, to achieve the same flow rates with the smallest possible droplets will require more hydraulic injectors than air atomizing injectors. Finally, for the present application in which solid particles are dispersed in the liquid solution, the use of smaller flow rates per injector greatly increases probability of blockage of the liquid injector outlet orifice. However, offsetting these disadvantages is the elimination of the compressed air system with its attendant power consumption. It was, therefore, of interest to consider hydraulic injectors for $SO_2$ control. Referring to FIG. 2, the outlet orifices for the hydraulic injectors can have the same outlet openings as shown in FIGS. 2B–D. As for the feed pipe, the air pipe and outer cooling jacket as shown in FIGS. 2A and 2E, are eliminated. Hydraulic atomizers are supplied by McMaster-Carr Company, Dayton N.J. 08810 and Spraying Systems Company, among others. As noted above the Spraying Systems' Model SU85 produces a flat fan spray at 36 psig air pressure and 35 psig water pressure resulting in a flow rate of 3 gallons per minute and droplets in the 100's of microns in diameter. A McMaster-Carr Catalog Number 3404K34 stainless steel hydraulic injector yields a 120° flat fan spray flow rate of 3 gpm at 40 psig. At 100 psig the flow rate increases to 4.74 gpm. However, the dimensions of the resultant droplet fan are substantially smaller than for the air atomized nozzle and the droplets size from visual observations is much greater, possibly as much as a factor of 10, which could be too large for effective coverage of the treated gas zone. Alternatively, a McMaster-Carr Catalog Number 32885K57 stainless steel hydraulic injector yields the same flow rates and droplet sizes at the same pressures but in a full cone spray pattern. According to the Spraying Systems catalog, an air atomized injector yields a Volume Mean Diameter, VMD, spray of 200 microns at 40 psig at a 8 gpm flow rate, while the VMD increases to only 400 microns at 100 psig and 12 gpm. On the other hand, a flat fan hydraulic spray injector has a VMD of 2500 microns at 10 gpm and 40 psig, and a VMD of 1400 microns at 15.8 gpm and 100 psig. Since the desired droplet size range for practicing the present invention is in the 10 to 1000 micron range, it would be necessary to significantly increase the number of injectors as well as the feed pressure in order to obtain the same droplet range and flow rates as with air atomized injectors. Nevertheless, there may be conditions, such as lack of available plant compressed air, or cost considerations, (a stainless steel hydraulic injector costs as much as 20 times less than an air atomized injector at the same rating), or less stringent $NO_x$ and $SO_2$ reduction requirements, that may favor use of hydraulic injectors.

For practicing this invention in large industrial and utility boilers, the preferred insertion of the injector assembly in the hot gas flow downstream of the primary combustion zone is shown in FIGS. 3A–B. These boilers operate at various loads and as a result the gas temperature at the optimum location for insertion of the injectors changes. In FIGS. 3A–B, the boiler 31 has a furnace wall 313, coal burners 32, a primary flame zone 33, a slag screen 34, convective tube banks 35, a zone 36 where the effluent gas temperature is between 1700° F. to 2200° F. In some boilers, especially at part load, the gas temperature in flame zone 311 between the convective tube banks can also be partly in the lower end of the 1700° F. to 2200° F. temperature range. Feature 39 indicates the flat plane droplet spray pattern provided by the various injector arrangements that were used in prior tests in a 37 MW and 100 MW utility boilers to develop a NOx control invention by Zauderer (U.S. Pat. No. 6,048,510) and that was also partly used to practice the present invention in a 50 MW boiler. Several droplet injector assemblies 37 and 312 are inserted with the flat plane droplet spray 39 in a plane that is perpendicular to the gas flow direction immediately upstream of the flow entering the slag screen 34 and convective tubes 35. The droplet injectors 37 and 312 are inserted, preferably through existing ports, on one, two, three, and possibly even four boiler walls, roughly at the same boiler elevation within zone 36. These flat plane spray patterns which are perpendicular to the upward flowing combustion gas will intercept almost all the gas in the zone 36 at which the $NO_x$ and $SO_2$ capture reactions are effective, namely between 1700 and 2200° F. Note that a major advantage of using these wide angle, flat plane injectors is that the reaction zone for $NO_x$ and $SO_2$ reduction can be covered with a minimum number of injectors. Typically there are sufficient access ports in these boilers so that the injectors can be inserted through these existing openings. If a large number of injectors were required, as would be the case if the injector produces a narrow cone spray, as in FIG. 2B, it would be necessary to cut openings in the boiler tube wall and reroute the water-steam tubes, a costly operation that obviously requires shutting down the boiler. The injector outlets are placed at the outer edge of zone 36 and they can be moved further away from the wall or nearer to the boiler wall as the temperature zone 36 expands or contracts as the load on the boiler changes. In general in a 100 MW boiler, based on Zauderer's prior tests (U.S. Pat. No. 6,048, 510) it is estimated that between four and six SU85 flat plane injectors would be needed to cover the entire zone 36 with droplets. In smaller boilers, such a 37 MW boiler, two SU85 injectors may be adequate. For multi-100 MW boilers, the placement of the droplet injectors would be similar to those shown in FIG. 3, except the larger Spraying Systems' one inch pipe 1JBC assembly and SU155 spray setup would be used. It may also be desirable for large boilers to add additional injectors 316 to produce a flat plane spray 310 nearer to the boiler wall in order to cover a wider area of the gas cross-section.

Alternatively, or additionally, flat plane injectors 310 can be inserted somewhat upstream of the slag screen 34 to produce flat fan spray 39 perpendicular to the gas flow direction as the turns to the horizontal direction prior to passing the slag screen. Additionally for those situations such as part load where the temperature in zone 311 is higher and in the appropriate temperature range noted above, the flat fan spray injectors 38 can be inserted between the convective tube banks 35 to produce a flat fan spray 39 perpendicular to the gas flow direction in the tube banks. In all these cases the injectors used are similar is size as the 312 injectors. Since the CaO reaction with $SO_2$ is a heterogeneous gas-solid reaction with slower reaction rates than the urea-$NO_x$ gas-gas reactions, the use of injectors 310 or 38 is less desirable than injectors 312.

Note that in the description on how to practice the present invention repeated reference has been made to spray injectors manufactured by the Spraying Systems Company and to MacMaster-Carr Company. This documentation has been used because several of these injectors were used in developing the design for practicing this invention. However, it is to be noted that the critical elements needed to implement this invention, namely the spray pattern, the wide droplet size distribution and size range, the design of the cooling method for the injectors placed in the hot gas stream, can be practiced with any injector design that will produce the desired results.

Another aspect of this invention is a simple means of feeding the lime or very fine limestone and urea to the injector system. Referring to FIG. 4, the lime or very fine limestone can be delivered in powder form to a utility boiler by tanker truck or railcar, element 41 in FIG. 4, both with bottom discharges 42. The lime drops either through a rotary valve or screw feeder 423, into an eductor, 44 at a rate equal, or greater than, to the quantity of calcium oxide needed to reduce the $SO_2$. One mol of CaO theoretically reduces one mole of $SO_2$. However due to process inefficiencies, this number will be higher. It is estimated that using the present droplet injection system will allow operation with a mol ratio less than 2, i.e. better than 50% calcium utilization. A high pressure blower, 43, conveys the limestone or lime powder at several 1000 feet per minute through a feed pipe 47 into a mixing tank 45, where the lime is mixed with water 46, to reach the desired concentration for optimum $SO_2$ reduction. A propeller mixer 408 in tank 45 disperses the lime or very fine limestone particles in the water. As described above, the mechanical mixer must provide sufficient turbulence to fully disperse the lime particles in the water at the maximum lime concentration attainable, which is about 30% by weight, and eliminate agglomerated lime clumps. Furthermore, the uniform mixture should be achieved without the need of surfactants or stabilizers. The mixing is accomplished by using one or more propellers, with their number increasing with increasing tank size, placed along a motor driven shaft and inserted to cover the entire depth of the mixing tank, with said propellers having an outer diameter that is a large fraction of the diameter of the mixing tank. It is preferred to mix the lime or very fine limestone at a rate that is slightly higher than the rate of injection of the mixture into the boiler. This would eliminate the need for mixing in a surfactant 409 and possibly a stabilizer 407 if it is necessary to store the mixture in tank 45 for an extended period before use. However, it has been found in tests in the 20 MMBtu/hr boiler that even 30% lime-70% water mixtures prepared many days previously can be re-activated by mechanical mixing prior to use. Therefore, it is most unlikely that additives 409 or 407 will be needed, and they are only listed as an option for unusual uses. However, it may be necessary to use additives 409 or 407 if very fine limestone is used instead of lime because limestone is substantially less hygroscopic than lime.

In reducing this invention to practice it was found that subsequent to vigorous mechanical mixing, the lime-water mixture can be maintained in uniform suspension by re-circulating the mixture with a centrifugal pump as described next, and this method can be used for the mixing vessel 45 of FIG. 4. However, it is preferred to utilize a mechanical mixer to maintain the lime dispersed in the mixing vessel 45.

Again referring to FIG. 4, the urea can be delivered in powder form to the same utility 20 boiler by tanker truck or railcar, element 440 in FIG. 4, both with bottom discharges 442. The urea drops either through a calibrated rotary valve or screw feeder 453, into an eductor, 454 at a rate equal to the quantity of urea needed to reduce the NOx. One mol of urea theoretically reduces two moles of NOx. A high-pressure blower, 43, conveys the urea at several 1000 feet per minute through a feed pipe 470 into a small mixing tank 45, where the urea is mixed with the same water 46 as is used for mixing the lime, to reach the desired concentration for optimum NOx reduction. A mixer 408 in tank 45 dissolves the urea particles in the water.

A vent and baghouse, 48, removes the conveying air. The mixing tank will be most economically placed at ground level, while the injectors of the lime mixture into the boiler will be at an elevation high up in the boiler, which could be at 50 feet to over 100 feet above ground level depending on the size of the boiler. Therefore, to practice this invention, a sump pump 49 in mixing tank 45 is used to maintain the prime for a pump, being preferably a high head centrifugal pump 491 or alternatively a progressive capacity gear pump 491, that will pump the mixture to a tank 410 placed at the elevation of the injectors 37, 38, 311, 312, and 316 into the boiler 31 of FIG. 3. This latter tank also may contain an optional mixer 411 that operates continuously to maintain the particles in suspension. From this tank 410, a sump pump 412, feeds a high-pressure pump 413, whose outlet flow is split. Over 50% of the flow is re-circulated back to tank 410 to maintain the liquid mixture in tank 410 in a highly turbulent state in order to maintain uniform suspension, while the balance flows to the injectors. Valves 414 and 417 are used to adjust the split flows, as necessary. The air pressure provided to air pipe 420 should not significantly exceed the liquid pressure at injector 418, otherwise the air flow will back flow through the liquid pipes and cause the pumps 412 and 413 to lose their prime With water, a multi-stage high pressure pump, such as Grainger Co. Stock No. 2PC31, a 2 hp, 3 phase motor, 3 stage pump can be used to deliver about 30 gallons per minute of water from ground level through a 1 inch internal diameter rubber hose to an elevation of 100 feet, equal to 43 psig from gravity, plus about 23 psig from the hose friction loss. The friction loss in the 100 foot long hose is computer with the standard friction flow equation, as described in Rohsenow (loc.cit. Ch.4, Equation 4.19) With water the flow is turbulent with a viscosity of 1 cp. As noted with a 30% lime-70% the effective viscosity is about 30 cp. This increases the pressure loss due to friction, but not enough to prevent the use of this pump from transferring the water-lime mixture using pump 491 from tank 45 at ground level to tank 410, which is near the elevation of the injectors 418 high up in the boiler furnace. The validation test is described in the "Result 6" Section of this invention.

This result is of major importance in practicing this invention because it allows the use of simpler and far less costly centrifugal pumps for this application, instead of the much more costly progressive cavity gear type pumps. Alternatively, a single stage, high head, centrifugal pump, such as Marathon Electric Company, Wausau, Wis., Model TD182TTFR7321ANL, 3 hp, 3 phase motor driven pump can be used instead of said 2 hp pump. The internal passages in the rotors in the 3 stage pump are very narrow and therefore more susceptible to blockage. These two pumps or larger or smaller rated pumps, depending on the fluid injection rate required, can also be used as pump 413 to supply the lime injectors. Alternatively, but at substantially higher cost, a progressive cavity pump, as described above can be used for either pumping function. Both above named centrifugal pumps were used in the manner of pump 413 in reducing this invention to practice.

With coal-water slurries that contain 50% to 65% solids loading by weight, positive displacement pumps have been used. It is not essential to use such pumps in the present application with up to 30% lime loading. However, a procedure to select such pumps is noted here because there may be reasons, such as long-term durability, to select this pump instead of centrifugal pumps. One suitable positive displacement pump is a progressive cavity pump, such as Grainger Model No. 1P898, that will pump about 2.7 gpm at 40 psig at 900 rpm pump revolutions and using ⅓ hp. With these positive displacement pumps, the viscosity of the liquid-solid mixture is critical both in determining pump performance and durability. The 900 rpm rate applies to fluids with viscosities in the 500 to 1000 cp, which is the range for CWS with 50% to 65% solids loading. However, as noted that with 30% lime loading, which is preferred for the present invention, the effective viscosity will be 30 cp as deduced from flow measurements during reducing this invention to practice, and the pump speed can be increased to 1750 rpm and the capacity increased to 4.9 gpm at ⅓ hp. Note that this pump with motor costs almost as much as the above noted 2 hp pump, despite its almost factor of 10 lesser capacity. As noted above, the viscosity deduced from conventional viscosity meters for this lime mixture is over 30 times greater than the effective viscosity, with the latter being the determining viscosity.

One area where the progressive cavity pump may find application is for hydraulic injection of the lime or very fine limestone and urea, which may well require up to 100 psig liquid pressure to achieve sufficiently small outlet droplets. In that case, pump 413 in FIG. 4 would be used to feed the hydraulic lime injectors directly and a centrifugal pump, with re-circulation of the liquid in tank 410, or a mechanical mixer would be used to maintain a uniform suspension in tank 410.

One factor to be considered in utilizing the above centrifugal pump is the need to increase the hp rating of the centrifugal pump drive motor. At 30% lime loading, the pump motor power for the above 2 hp pump increased by about 15% above its peak rated capacity. Instead of replacing the motor with a higher capacity motor an adjustable frequency drive was used. Specifically, a variable frequency ac motor drive was used. It was manufactured by the Cutler-Hammer Company Model AF91AGO coo3d, that is rated at 3 hp, 3 phase input and output and that is adjustable from 0 to 60 hertz. This type of ac drive has the advantage that a 10% reduction of motor and pump speed reduces the motor power required by 27% and it reduces the pump output pressure by 18%. A farther advantage of the variable speed rive is that it may eliminate the need for an output control valve with its attendant pressure drop because the motor speed can be varied to achieve the desired pressure and flow rate from the pump.

This ac drive is only available for 3 phase motors. Consequently, a pump supplied with a single-phase motor cannot be used for this purpose. As a result a third type of pump which was utilized to reduce this invention to practice, namely a jet well pump, which provides high pressure and high liquid flow rates at modest power, could not be used with an ac drive because the pump rating was not adjustable. At its rated motor output power, the motor overheated. The pump was a Gould Pumps Company, Seneca Falls, N.Y., Jet Pump Model J05N direct coupled to a ½ hp single-phase motor. It delivered over 10 gpm at 40 psig output with the ½ hp direct drive, motor supplied by the manufacturer. However, when pumping 30% lime-70% water mixture, the motor power was about one-third higher than rated output, and the motor overheated. It is possible to replace the motor with a higher rated motor, but that is a special and more costly modification.

The preferred option for delivering the liquid mixture to the injectors is to a large extent dictated by cost considerations. The price of these pumps varies considerably and a tradeoff between pump type, pump rating, degree of re-circulation, degree of mechanical mixing, pump durability must be made to arrive at the most economic solution.

The liquid is pumped at a pressure, measured by bourdon pressure gauge 415, designed to produce the proper droplet sizes in the air atomized 418, injector. For air atomization, this liquid pressure can be in the range of 30 to 55 psig. Compressed air is fed through the air pipe, 420, to the injector 418. The proper flows and pressures at the injectors are obtained by using all of the following:

Pressure gauges 415 and 421 are used for water and air.
Flow meter 416 capable of measuring the flow of an opaque liquid such as is formed with the dispersion of lime in water, with said flow meter being selected by way of example from the group of paddle wheel, turbine, or in-line flowmeter with magnetic plunger, and flow meter 422 for air.
Valves 414 for water, and 424 for air control these flows. These valves and meters can be readily automated to adjust the flow rates and pressure as $SO_2$ reduction rates are changed. Note, however, that by using a variable frequency ac drive, some or all of these valves can be eliminated.

The flowmeter 416 can be selected from the group of paddle wheel, or ultrasonic doppler flowmeters. These units vary considerably in cost, reliability, and durability in particle-laden liquids. Examples of these meters are Omega Corp., Stamford, Conn., Model FD-603 NI meter, or FD-603A ultrasonic doppler probe, or series FP7000 paddle wheel probe with a DFP700 meter instrument.

An even simpler and very low cost alternative is to place a float switch at the bottom of tank 410, which will activate pump 412 and 413 to refill tank 410. The actual flow rate can be determined by the decrease in the liquid level of feed tank 410. In the absence of a flow meter 416 one can also install a pressure transducer 450 at the inlet to the injector assembly at the base of liquid pipe 419. Any blockage of the liquid flow will result in an increase in pressure and the injector can be removed either manually or automatically from the boiler. In fact, the entire system for practicing the present invention can be readily automated, including the measuring of the average feed rate and the sending of an alarm in the event of feed fluid stoppages or blockages.

The aqueous mixture flows through pipe 419, which is in parallel to compressed air pipe 420, to the rear end of the injector 418. The injector 418 is inserted through the furnace wall of a boiler into the combustion gas zone of the boiler, as described above. Both the liquid pipe 419 and the compressed air pipe 420 are each surrounded by pipes 432 and 433, respectively, through which water flows to cool the pipes 419 and 420. The water to pipes 432 and 433 flows from a water storage tank 430, which is supplied by water pipe 431, at a rate controlled by valve 435 and a flow meter 434. The reason for a tank 430 is to provide gravity fed cooling water to the injector pipes 419 and 420 in case a power failure cuts off cooling water to the injectors. Meter 434 can be a simple rotameter. Alternatively, pipes 419 and 420 can be wrapped with a high temperature woven insulating tape or surrounded by a refractory ceramic insulating material that is held in place with metal studs that are welded to the outside of the pipes.

Another item necessary to practice this invention is to measure the gas temperature at which injection of the lime or limestone takes place. Since the desired temperature is preferably between about 1700° F. and 2200° F., a ceramic insulated Type K thermocouple can be used. The most accurate method to measure the temperature is to place the bare thermocouple tip inside a ceramic tube with the tip within about 1 inch from the end. A one-foot long tube was found adequate for this purpose. The ceramic tube was inserted into a long stainless steel pipe that was inserted into the boiler. For insertion of more than 1 minute, a water-cooled jacket is placed around the pipe. For shorter insertion periods, the steel pipe can be inserted un-cooled into the furnace. Measurements with the protruding thermocouple tip and the recessed thermocouple tip in a ceramic tube with gas suction in the latter case, yielded almost identical gas temperatures in the small 17,500 lb/hr steam boiler for values between 1200° F. and 2000° F.

In reducing this invention to practice, a total of 41 days of tests were performed in the 17,500 lb/hour boiler of FIG. 1. The tests were performed over a 9-month period between December 1999 and August 2000. Each test consisted of a heat up period of the combustor and boiler of one or more hours, followed by a nominal 1 to 2 hour test period which began and ended with powdered sulfur injection to generate $SO_2$ and contained a period of aqueous lime injection for $SO_2$ reduction. In the first three series of tests, the sulfur powder 13 in FIG. 1A was injected through one of the ports 8 that had been used previously to inject pulverized coal. In all subsequent tests, four injection ports 8 were used. This resulted in more consistent $SO_2$ readings between a probe placed at the exit nozzle outlet 4 in FIG. 1A and a probe placed in stack 17 of FIG. 1. The $SO_2$ concentrations at these locations were sequentially measured with a Thermoelectron Model 40, pulsed fluorescence meter. The $SO_2$ emission levels were computed from the measured $O_2$ values at said gas probe locations.

In all the tests, heat input was 90% oil and 10% propane. In the final tests, the sulfur powder was mixed with sawdust in order to obtain a more uniform sulfur injection rate. The total heat input to the combustor for these tests ranged from about 7 MMBtu/hr to 11 MMBtu/hr, which was up to about 50% of the rated heat input to the combustor. The injected sulfur rate yielded computed $SO_2$ concentrations between 1.5 to 10 lb/MMBtu. Many of the tests were conducted at a nominal initial $SO_2$ concentration of 3 lb/MMBtu, corresponding to firing with a 1.5% sulfur coal. Most of the tests were conducted at a stoichiometric ratio of 1.5, namely 50% excess air in the primary combustion chamber 3 in FIG. 1A. This very lean fuel mixture was selected in order to duplicate the gas temperature in the 1700 to 2200° F. range at which the thermodynamic equilibrium sulfur reaction with calcined lime is effective. This approach simulates the post-combustion temperature zone of large boilers. [Note that the present equilibrium $SO_2$ reduction approach differs from the non-equilibrium $SO_2$—$CaO$ capture reaction that is disclosed by Zauderer in U.S. Pat. No. 4,765,258, which was discussed in the Background section of this invention.] Final combustion air, introduced in the transition chamber 5, increased the stoichiometric ratio to the range of 2 to 2.5.

Combustion air was provided by a high-pressure fan, which cooled the combustor walls before its introduction in a swirling manner through the combustor end wall. Part of the wall cooling air 11 from the downstream end of the combustor and exit nozzle was exhausted into chamber 5 in FIG. 1. Additional air was also drawn into the combustor outlet chamber 5 through cracks in the chamber 5 and boiler 1 walls the boiler FIG. 1 due to the negative, sub-atmospheric draft of 1 to 3 inches water gage produced by the stack fan. This resulted in a higher $O_2$ level in the stack than the values computed from the combustion air.

The overall objectives of the tests were to develop means of preparing high lime content slurries, to develop effective methods for pumping the slurry to the injectors that are inserted in the combustion gas stream, and to determine the most effective injector designs. An additional important objective was to determine the effectiveness of combined $NO_x$ and $SO_2$ reduction with injection of a urea-lime-water mixture into the appropriate combustion gas stream. The primary measure of effectiveness of any of these procedures was the magnitude of reduction of the stack $SO_2$ and $NO_x$ concentrations due to lime and urea injection.

An important teaching of this invention is that cost of reduction to practice is an important consideration in the value of an invention. As extensively described in this document, there are numerous, complex, little understood, and even unknown parameters that influence the effective utilization of this invention. Therefore, numerous tests under varying operating conditions are necessary in order to elicit the data needed to practice this invention in the most efficient and economical manner. The primary target for this invention is coal fired energy systems because they have the highest $SO_2$ and $NO_x$ emissions of all fossil fuels. However, implementation of an extensive parametric test effort with coal even in the comparatively small 20 MMBtu/hour combustor-boiler facility that was utilized to reduce much of this invention to practice is very costly. For that reason, fuel oil and propane was substituted for coal, and the heat input was reduced to one-half or less of said combustor's rating in the present test effort. This greatly reduced the cost of the effort. The 1 to 2 hour combustor heatup cycle prior to coal firing in this slagging unit was eliminated. The number of operators needed to operate the facility was reduced from three to one, the power and fuel consumption was reduced by factors of 2 to 3. Nevertheless, the desired combustion gas conditions for the post combustion zone of a coal fired boiler, namely 1700° F. to 2200° F, were created either at the downstream end of chamber 3 or in chamber 5 of FIG. 1. Furthermore, even greater flexibility in duplicating a wide range of coal sulfur and nitrogen levels were attained by injecting sulfur powder and aqueous ammonia with the fuel.

In keeping with this low cost validation approach and to further reduce the cost of developing the proper procedures for practicing this invention, several additional tests were performed in March 2001 in which the fuel heat input to the combustor was reduced to the range of 2 to 2.5 MMBtu/hr. As before, the fuels were No. 2 oil at 5 to 7 gph with the balance propane. The oil was injected through a mist atomizer, selected from one of McMaster Carr's Model 3178Kxx, where xx denoted the capacity ratings of these hydraulic atomizers that were designed for water mist production. The combustion air 6 was supplied by the 5 hp primary fan whose outlet duct was divided into two streams. One stream flowed directly into upstream end of combustion chamber 3 in FIG. 1, as in all prior tests. The other stream flowed into air cooling pipes 101 and whose outlet was re-circulated to air inlet 6. In addition, the wheel of a 10 hp fan was connected to a 3 hp motor using a belt drive. Due to the mismatch between the fan wheel and motor power, a Cutler Hammer Company Model AF91 3 hp variable speed drive was used to control this fan at less than the full motor rating. The air output from this fan flowed through the downstream air cooling pipes 101 and supplied the airflow 11 into chamber 5 of FIG. 1. At these low heat inputs, the downstream end of combustion chamber 3 in FIG. 1 was in the proper temperature range of 1700° F. to 2200° F. for lime and urea injection through port 14 in FIG. 1.

Specifically, the following were the primary test objectives and the key results in this 20 MMBtu/hour—boiler test effort:

Objective 1: To develop techniques for preparing uniformly dispersed lime-water mixtures at maximum lime concentrations with or without additive surfactants or stabilizers.

Result 1: It was determined that by using a motor driven shaft having about equally spaced multiple propellers resulted in a uniformly dispersed lime at concentrations as high as 30% by weight without the need for additives. In fact, the addition of ¾% by weight of a surfactant, Trade name-DAXAD, to a 25% by weight lime in water mixture did not appear to significantly improve fluidity of the mixture. In fact it had a somewhat deleterious effect in that it produced a foam on the surface of the mixture liquid. To maintain the mixture in uniform suspension, part of the arrangement shown in FIG. 4 was used. The mixture used for injection into the combustor was placed in either a 15 or 30 gallon tank, such as 410 in FIG. 4. Over half the first test series were performed with lime concentrations of about 15%, using the Gould J05N jet well pump. The jet well pump, 413, was primed with a submersible pump 412. By re-circulating the liquid, the lime was maintained in uniform suspension. Valve 417 was adjusted to obtain a 30 to 40 psig fluid pressure at the 413 pump outlet, while valve 414 was used to control the flow to one or two Spraying Systems air atomized injectors. However as the concentration was increased to 30% this pump's ½ hp motor overheated repeatedly. As a result the above noted Marathon Electric Company 3 hp pump was used to re-circulate and feed the 30% lime mixture to the injectors. This pump has adequate excess capacity to prevent overheating of the motor.

Objective 2: To develop methods for uniformly feeding and dispersing sulfur powder in the 20 MMBtu/hour combustor to yield uniform $SO_2$ concentrations in the range of 1.5 to 6 lb/MMBtu in the combustion gas stream.

Result 2: The 2 inch diameter helix in the Accurate Model 600 feeder used for these tests did not rotate at constant speed at the very low feed rates of 10 to 20 lb/hr that were required to achieve the desired $SO_2$ concentration of 1.5 to 6 lb/MMBtu. Shifting to a smaller one inch auger in this feeder and increasing the auger's rotational speed presented another problem in that the sulfur powder tended to agglomerate into clumps. Agglomeration prevented the sulfur from uniformly filling the one-inch diameter flights. This was partially solved in part by first forcing the sulfur through a fine sieve placed above the auger to break up the clumps before dropping into the auger. An alternative method was used with a larger 2 inch diameter auger whose outlet flow was divided into two streams. One sulfur stream dropped from the auger outlet into the pneumatic feed line to the combustor, and the other stream was collected in a barrel and recycled. Both these methods required continuous attention by an operator during the test period. Consequently, the final preferred solution that yielded uniform $SO_2$ concentrations was to break up the sulfur clumps by forcing them through a sieve and mixing the sulfur powder with fine sawdust in ratios of 2 or 3 parts of sawdust to one part of sulfur. The sulfur-sawdust mixture was placed in the Accurate 600 feeder with a 2 inch auger, and this resulted in uniform feeding of sulfur powder into the combustor. The above feed methods applied to the tests in the 10 MMBtu/hour heat input range where the sulfur feed rate was in the range of 20 to 40 lb/hours, plus the sawdust addition.

When the reduced heat input of 2 to 2.5 MMBtu/hour required further reductions in the sulfur injection rate to nominal 7 lb/hour range. It was diluted to 22% by mixing it with sawdust to yield a total feed rate of 32 lb/hr. Since this was much below the minimum feed rate of the Accurate Model 600 feeder, a feeder was fabricated consisting of a 1 foot cube wooden box with an inverted V shaped bottom. A 17 inch lone, 1 inch diameter, wood boring auger was placed on the bottom of the V. The auger was coupled to a fractional hp DC motor that was controlled by a rectified variable speed drive. The sulfur-sawdust mixture 13 was fed into a 1 inch eductor and blown pneumatically into the combustor through opening 8 into combustion chamber 3 of FIG. 1. It determined that the key element in successfully using this feeder was the attachment of a pneumatic rotary ball vibrator to one of the wooden V shaped walls. The vibration resulted in the sulfur-sawdust mixture slowly decedning to the auger at the botto'm of the inverted V.

Objective 3: To develop preferred injector designs and injector placements in the post-combustion gas flow.

Result 3: As noted in connection with FIG. 1 above, the ¼ inch Spraying System Company injectors were inserted at four locations in the combustor and boiler.

In the $1^{st}$ group of tests, injector 153 was inserted through a port 156 in the rear of boiler 1 in FIG. 1A. It consisted of the six outlet spray pattern 25 of FIG. 2C, using SU29 spray nozzle that was attached at the tip of 12 foot long, ¼ inch air and ¼ inch lime-water mixture pipes. The injector produced a spray 154 in combustor-boiler transition section 5 of FIG. 1A. At a Ca/S mol ratio of 2.2, the measured $SO_2$ reduction at the stack of the boiler was only 7%. The addition of a flat spray nozzle SU43 of FIG. 2D, inserted as injector 152 to produce a flat fan spray 161 across the outlet of the exit nozzle 4, improved the $SO_2$ reduction slightly to 17%. Both these readings indicate very low $SO_2$—CaO reaction rates. The stoichiometric ratio, SR1, in chamber 3 computed from the air and fuel flows was 1.63, and the stoichiometric ratio, SR2, after the introduction of additional air into chamber 5 was 2.5. Theoretically the gas temperature in the spray nozzle location in chamber 5 based on SR1 was somewhat over 2000° F. However, measurement of the combustion gas temperature in chamber 5 with a K-type thermocouple yielded a value of 1700 to 1800° F., which is at the low end of the effective reaction rate. The additional impact of boiling and vaporizing the 85% water content of the lime mixture to these gas temperatures results in a lowering of the gas temperature by several 100° F., a value that is too low for effective calcination of the lime and $SO_2$ capture.

In the $2^{nd}$ group of tests, injectors 153 and 152 were removed and replaced with injector 151 of FIG. 1. A larger SU46 injector, with its six-outlet spray pattern 25 of FIG. 2C, was used. It was inserted through the top of transition chamber 5 of FIG. 1A with the nozzle axis facing upstream into the exit nozzle 4. Its spray pattern 19 projected into the exit nozzle. In addition, a second injector 16 with a SU43 flat fan spray 26 in FIG. 2D was inserted through opening 14 at the top downstream end of the of combustion chamber 3. Its injector tip protruded several inches in the gas stream, and with the flat fan spray pattern 18 perpendicular to the axial gas flow direction. In these tests, SR1 was 1.57, and gas temperature measurements yielded a combustion gas temperature in this region between 2000 and 2300° F., which is the upper end of the desired range for effective $SO_2$ and $NO_x$ capture. A metal gas sampling probe 165 inserted into chamber 5 with its tip about 6 inches downstream of the outer diameter of exit nozzle 4 yielded $SO_2$ reductions in the range of 50% to 70% with the Ca/S mol ratio of 2.3. However, the $SO_2$ reading at the stack outlet 17 of the boiler 1 showed a reduction of only 17%. In these tests, the lime concentration in water was 17% by weight, which meant that the water again cooled the gas by several 100 degrees F., leaving the gas temperate within the effective range for effective $SO_2$ reaction with CaO. However, the lower $SO_2$ reduction at the stack indicated that a significant part of the combustion gas must have bypassed the zone of optimum CaO—$SO_2$ reaction. The suction inlet of the gas sampling probe 165 was placed immediately downstream of the exit nozzle 4 outlet, a location that intercepted the zone of optimum interaction between the injected lime and the $SO_2$ gas. However, $O_2$ readings near the wall of chamber 5 showed substantially higher oxygen levels near the wall than in the immediate outlet of the exit nozzle 4. This added oxygen was provided by air stream 11 exiting the nozzle wall cooling air pipes 101 in FIG. 1, lowering the temperature of the combustion gas leaving exit nozzle 4 near the wall below that required for effective $SO_2$ capture. This could explain the lesser $SO_2$ reduction measured in the stack where both the treated and untreated gas streams had been well mixed.

In the $3^{rd}$ group of tests, injector 151 was removed and replaced with a SU23 flat fan spray injector 17 inserted through opening 111 in the floor of combustion chamber 3 so as to produce the flat fan spray pattern 18 opposite injector 16 that was inserted through the roof of the combustor. In the first test in this $3^{rd}$ series and with 17% lime content, the $SO_2$ reduction measured in chamber 5 was 44% and in the stack it was 36% with the Ca/S mol ratio of 2.3 In a subsequent test in this $3^{rd}$ series, with 20% lime content, the $SO_2$ reduction in chamber 5 was 80% at Ca/S mol ratio of 1.8. For a Ca/S of 1.4, the $SO_2$ reduction was 47% in chamber 5, and only 27% in stack 17, again indicating that part of the gas flow was not treated as it mixed with the cold, combustor wall cooling air entering chamber 5. In another test in this series, with 14% lime, and at a higher Ca/S mol ratio of 2.7, the SO$_2$ reduction in chamber 5 was 84%, while at the stack it was only 16%. The SO$_2$ measurements in chamber 5 show that the gas stream that was intercepted by the lime spray was effectively reducing the SO$_2$. The addition of the cold air flow 11 into chamber 5 from cooling air pipes 101, which is an artifact of this test configuration, resulted in an apparent decrease in the SO$_2$ reduction at the stack where both gas streams had mixed.

As described above, in these tests the method of preparing of the sulfur powder, which produced the SO$_2$ in the combustion gas being treated, was continuously improved in order to obtain a more uniform feed of the sulfur into the combustor 2 of FIG. 1. The tests in these four series were conducted with sulfur only, using the various sulfur feeding methods described above. As noted above, the most uniform feeding was obtained by mixing the sulfur with sawdust. This latter method was first used in the tests described in the "Result 6" Section. Also, in the above three tests series only one of the eight-injector ports 8 of FIG. 1 was used.

In the 4$^{th}$ series of tests, the sulfur powder was injected through four injection tubes 8 placed equally in the front wall of the chamber. In this case, with only 14% lime in the mixture and at a Ca/S mol ratio of only 1.3, the SO$_2$ reduction in chamber 5 was 56% and at the stack it was 41%. This result shows that another factor in the scatter of the data between different tests and between the stack 17 and chamber 5 was also due to non-uniform sulfur injection into chamber 3 in the three earlier tests series. Non-uniform sulfur injection created non-uniform SO$_2$ concentrations in the gas stream.

Despite the considerable scatter in the SO$_2$ results from run to run, due to variations in the combustion conditions, the sulfur injection rates, and lime injection rates, certain trends are clearly discernable.

1) In all cases, the introduction of the aqueous lime mixture leads to substantial SO$_2$ reduction.
2) The proper temperature range of around 2000° F. is critical to SO$_2$ reduction with the process disclosed in this invention. Furthermore, in case the water content of the lime-water mixture is in excess of 80% by weight, which can lower the gas temperature by several 100° F., the gas temperature must be initially above 2000° F. This explains the lesser SO$_2$ reduction results when injecting lime in the cooler chamber 5 of FIG. 1A compared to the much better results when injecting in the hotter downstream end of the combustion chamber 3.
3) The dispersion of the lime droplets throughout the combustion gas zone being treated is critical to efficient SO$_2$ reduction at a low Ca/S mol ration. This was shown by the high SO$_2$ reduction measured in some tests at Ca/S mol ratios only slightly higher than the stoichiometric value of 1, while in other tests, very little increase in SO$_2$ reduction was noted even at Ca/S ratios above 3. The primary difference between the high and low reduction was in the placement of the injectors in the gas stream and the gas temperature at the injection location. Another result that appears to validate this conclusion is the substantial difference between the higher SO$_2$ reduction at the outlet of the exit nozzle versus the much lower reduction at the stack. As noted, this latter effect is attributed to mixing of hot combustion gases with cold air in the combustor outlet chamber 5 of FIG. 1.
4) The flat fan spray pattern that intercepts most of the gas stream in a plane perpendicular to the gas flow direction was the most effective method of reducing SO$_2$. This result is of particular significance because the flat fan spray pattern is the preferred one for spray injection in large industrial and utility scale boilers, as deduced from Zauderer's NOx control invention (U.S. Pat. No. 6,048, 510).
5) The major problem in practicing this invention in small boiler systems by the injection of an aqueous lime mixture is the difficulty of utilizing high lime concentrations of 30% in the small injectors suitable for these boilers. In the tests reported here, it was necessary to limit the lime concentration to less than 20% to prevent plugging of the small internal passage in the ¼ inch Spraying Systems injectors. Even at concentrations in the mid-teen percentage range at which most of the tests reported above were conducted, the injectors were frequently subject to blockage. This was another factor that may have partially accounted for the variable SO$_2$ reduction results. Furthermore, the resultant high water content of the lime-water slurries could reduce the combustion gas temperature by up to 10%. Therefore, it was necessary to maintain the gas temperature in the proper range for effective SO$_2$ reduction by adjusting the combustion stoichiometry.

It was, therefore, concluded that for small combustor-boiler systems, the use of dry lime powder injection would be preferred because uniform dispersion of the lime particles, which are generally under 10 microns in diameter and are immediately entrained in the gas stream can be more readily achieved in small boilers. As noted in the Background discussion of this invention, previous injection of lime powder though a single pipe into the furnace region of the 17,500 lb/hr boiler of FIG. 1, at the outlet of transition chamber 5, had resulted in over 80% SO$_2$ reduction measured at the boiler stack at a high, economically unattractive, Ca/S mol ratio of 4. Said test had been performed with coals having sulfur contents in the 2% range, which yielded SO$_2$ concentrations in the 3 lb/MMBtu range. Also, the thermal input was generally in the 13 to 17 MMBtu/hour range so that the combustion gas temperature in said injection zone was in the 2000° F. range needed for effective equilibrium SO$_2$—CaO reaction.

Objective 4: To test the dry lime powder injection method for SO$_2$ control in small boiler systems.

Result 4: A series of tests were implemented in which limestone powder or lime powder was injected at two locations into combustion chamber 3.

In the 1$^{st}$ group of four one-day tests, limestone powder or lime powder was injected pneumatically though a pipe that was inserted through slag tap opening 111 in the downstream floor of combustion chamber 3 of FIG. 1A. The tip of injector pipe 240 of FIG. 2F was flattened 10, into a fan shape 242 of FIG. 2G in order to spread the injected powder in a flat plane particle stream transverse to the axial gas flow direction. SR1 in the combustor was 1.4, which yielded a gas temperature in the range appropriate for equilibrium sulfur capture. The highest SO$_2$ reduction in this 1$^{st}$ group of tests was obtained with lime at a Ca/S mol ratio of 2.1, where 42% reduction was measured in the stack 17, and 60% with probe 165 in the combustor exhaust chamber 5 of FIG. 1A. The results also showed that lime was much more effective in reducing SO$_2$ than limestone, typically by at least a factor of 2 for the same Ca/S mol ratio In the 2$^{nd}$ group of tests, dry lime powder 131 was injected though four of the eight, coal injector pipes 8 in FIG. 1, each of which was 90° apart. Sulfur powder 13 was injected through the other four coal pipes. This injection method produced the most uniform dispersion of both the injected sulfur powder and the injected lime powder. As a result, 90% SO$_2$ reduction was measured in chamber 5 of FIG. 1A, and 95% $SO_2$ reduction was measured at the stack for a Ca/S mol ratio of 3. This compares with a maximum 80% reduction measured with dry powder lime injection into the furnace at the downstream outlet of chamber 5 and at a Ca/S mol ratio of 4. The latter was measured with dry powder lime powder injection through one pipe whose exhaust was directed across the outlet plane of chamber 5. This resulted in a much lesser uniformity than the four-point injection used in the present test.

These results show that for smaller combustion chambers, uniform injection of dry powder lime yielded much greater $SO_2$ reduction than droplet injection. Uniform dispersion of the lime particles through the combustion zone can be readily achieved in small combustors. Conversely, the small internal passages of the lime droplet injectors needed for small combustors makes them very susceptible to blockage. Also, dry lime particle injection is more thermally efficient due to the absence of the energy loss from vaporizing and heating the high liquid content of the droplet injectors. For example, with 25% lime solids loading, the water content in the mixture can reduce the combustion gas temperature by about 200° F., from about 2200° F. to 2000° F.

Therefore, to practice $SO_2$ control with dry lime injection in small combustion systems, such as the present 20 MMBtu hour unit, that are fired with coal, the lime powder should be injected through a series of pipes whose outlets are placed around the circumference of either the exit nozzle 4 or the transition section 5 outlets in FIG. 1. The determinant as to placement of the injector pipes is the combustion gas temperature, which must be in the range of 1700° F. to 2200° F.

Uniform dispersal of the sub-10 micron lime particles throughout the proper combustion gas temperature zone of a large industrial or utility furnace is very difficult to achieve. One possibility is to use the flat pipe outlet 242 of FIG. 2F of round pipe 240 in FIG. 2G thereby producing a flat fan particles spray pattern 241. As noted above, this particle injector was utilized in the 20 MMBtu/hr combustor tests where it was inserted through opening 111 at the bottom of combustion chamber 3 of FIG. 1A. Due to the small chamber dimensions of only 30 inches in diameter, an unknown fraction of the particle stream impacted the top wall of the combustor. As noted above, at a Ca/S mol ratio of 2.1, $SO_2$ reductions as high as 42% were measured at the stack outlet of the boiler. This was not as high as the 90% reduction, although at a Ca/S of 3, that was measured with lime powder injection through the four injection ports 8 of FIG. 1. However, this type of dry powder injector is suitable for small to intermediate size boilers, namely between about 5 MMBtu/hour and several 100 MMBtu/hour, where the momentum of the lime particle transport air can project the particles throughout the interior of the post-combustion, gas temperature zone, without impact of the particles on the furnace wall.

Objective 5: To test the ability of ½ inch injectors to function with a high 30% lime mixture without plugging of the internal passages. These injectors are suitable for use in large boilers.

Result 5: A series of one half dozen tests were conducted in the 17,500 lb/hr combustor-boiler with the ½ inch droplet injectors. For larger boiler, such as a 37 MW electric output utility boiler, droplet injection is preferred. It is simpler to uniformly disperse droplets of varying size across a large furnace area, and, thereby, disperse the small sub-10 micron particles throughout this area. To test the technical issues involved in feeding and atomizing a 30% lime-70% water mixture, which is near the maximum lime concentration attainable with mechanical mixing, a series of tests were conducted in the 20 MMBtu/hour combustor-boiler with a ½ inch air atomized droplet injectors. In one group of tests, an air atomized droplet injector 151 in FIG. 1A, with single outlet 211 of FIG. 2B using Spraying Systems model SU82, was inserted through the roof of chamber 5 at the downstream end of exit nozzle 4 of FIG. 1 with the injector 151 facing upstream. In the other group of tests, the Model SU89 injector with six-outlets 25 of FIG. 2C was used in its place at the same location. Both these injectors are too large for use in the 20 MMBtu/hr combustor. However, the operational issues likely to be encountered in a large boiler, such as internal blockage of injector passages and dispersal of the droplets, can be studied in small boiler tests.

Unlike the test experience with the ¼ inch injectors, none of the internal injector passages plugged during the 20 MMBtu/hour combustor tests with the ½ inch injectors even at 30% lime concentration. The test with the larger ½ inch injectors were implemented at similar conditions as with the smaller units, namely at SR1 values in combustion chamber 3 of FIG. 1 that yielded gas temperatures in the 2000° F. to 2300° F. range at the downstream end of combustion chamber 3, where the droplet spray 19 from the ½ inch injector 151 was concentrated. The results are given under Result 6, below.

Objective 6: To test combined $SO_2$ and $NO_x$ reduction with a combined aqueous lime and urea mixture.

Result 6: The tests with the ½ inch injectors were also implemented with the addition of urea to the lime-water mixture in order to simultaneously reduce both the NOx and $SO_2$. As noted above, the gas temperature for effective $NO_x$ reduction by urea and $SO_2$ reduction by calcium oxide overlap. Also, the same injectors can be used for both processes. In order to produce $NO_x$ concentrations in the combustion gases similar to those encountered in coal combustion, ammonia droplets were injected in the closed end of the combustion chamber 3 of FIG. 1 through two ports 181 in the upstream end wall. This yielded $NO_x$ concentrations in the 0.2 to 0.5 lb/MMBtu range. This means of producing $NO_x$ in the combustion gas was previously disclosed in Zauderer's $NO_x$ control invention (U.S. Pat. No. 6,048,510).

With a single outlet injector of FIG. 2B and the SU82 atomizer, a typical $SO_2$ reduction of 41% were measured at the stack 17 of FIG. 1 with a Ca/S ratio of 3.3, and 50% $NO_2$ reductions were measured at a urea/NO mol ratio of 2.2. In another test, the $SO_2$ reduction reached 72% at a Ca/S mol ratio of 3.8, while the urea reduction reached 72% at a urea/NO mol ratio of 3.8. Part of this scatter in results, which had also been observed in the small droplet injector tests, was due to scatter in the powdered sulfur injection rate.

As stated above, the scatter in sulfur feed rate was due to the difficulty in achieving uniform feed rates at the low (generally less than 10 lb/hr) sulfur powder injection rates used in many of the tests. This non-uniformity was further aggravated by the tendency of the sulfur to clump, which required continuous manual intervention to maintain the sulfur feed auger flights uniformly filled.

Uniform sulfur feed rates were achieved by mixing fine sawdust powder with sulfur powder in ratios of 2 to 3 parts of sawdust to one part of sulfur. With this sulfur-sawdust mixture producing $SO_2$ and with the ½ inch SU82 single outlet injector of FIG. 2B, 27% $SO_2$ reduction was measured at a Ca/S of only 1.4, and 60% NO2 reduction was measured at a urea/NO mol ratio of only 1.2. The lime concentration was 30% and the urea concentration was 1% in the aqueous mixture.

On the other hand, with the same mixture and using the six outlet, ½ inch SU89 injector of FIG. 2C, the $SO_2$ reduction varied from 26% to 40% at a Ca/S averaging 2.6. This much lower reduction compared to the single outlet injector indicates that much of the spray pattern from the six-outlet injector impacted the exit nozzle wall. No $NO_x$ reduction was measured in this test. After the completion of this SU89 injector test it was found that the hydraulic nozzles used to generate the $NO_x$ with ammonia injection had failed due to overheating.

One additional very important benefit of the combined $SO_2$ and $NO_x$ reduction process is that by reducing the concentration of $SO_2$ in the combustion gas stream, the present invention reduces the potential formation of ammonia-sulfur compounds. These compounds can condense and deposit on air heater surfaces in the cooler downstream sections of large utility boilers. The need to eliminate such compounds from the combustion gases downstream of the zone being treated by urea or ammonia injection for NOx reduction is one major reason why the amount of injection of said chemicals must be limited. This in turns limits the amount of $NO_x$ reduction attainable with this non-catalytic post-combustion injection process. Another limitation on the amount of ammonia or urea injection is the need to prevent excessive ammonia gas plumes from the stack of the boiler. However, based on evidence in the open literature, the latter limitation is less stringent than the limitation due to ammonia-sulfur deposits on air heater surfaces. Therefore, the present invention teaches the benefit of improved $SO_2$ reduction and the benefit of reduced $SO_2$ on reducing deleterious effects of post-combustion $NO_x$ reduction with urea or ammonia.

Objective 7: To test the combined $NO_x$ and $SO_2$ control system in a utility boiler.

Result 7: The flat fan spray droplet injectors of FIG. 2D with the Spraying Systems Model SU85 atomizer was used in Zauderer's $NO_x$ control patent (U.S. Pat. No. 6,048,510) in utility boilers rated at 37 MW and 100 MW electric output, and subsequently in a 50 MW utility boiler.

To reduce the present invention to practice, a pair of tests was performed in August 2000 on the 50 MW utility boiler using the U85 flat fan spray injectors. The injectors 312 were inserted in each of the three walls of the 50 MW boiler high up in the furnace zone 36 of FIG. 3. The injector insertion location was at the same level as the previous test of Zauderer's NOx control invention (U.S. Pat. No. 6,048,510) with aqueous urea only that was performed in November 1999. In the 1999 test, two U85 injectors were inserted on opposite walls of the 50 MW boiler and between 30% and 40% NOx reductions were measured. In the August 2000 tests, a 25% lime, 6% urea, aqueous mixture was pumped with a 3 hp centrifugal pump to each of the three SU85 injectors in two short duration, ¼ hour long tests in the 50 MW boiler. The injector spray outlets were inserted between 2 feet in the first test and 4 feet in the second test past the furnace inner wall. A bare tip K-type thermocouple inserted to these distances measured a gas temperature of 2300° F., which is somewhat above the preferred temperature range at which the $SO_2$ and $NO_x$ reactions with lime and urea are most effective. The total quantity of liquid injected could at maximum reduce the combustion gas temperature in the injection region by 1% to 2%, i.e. about 20° F. to 40° F., which is insufficient to affect the reaction rates significantly.

In the $1^{st}$ test, the $NO_x$ reduction at the stack averaged 23% and a peak of 28%. In the $2^{nd}$ test with the injectors placed deeper into the combustion gas, the $NO_x$ reduction averaged 30%, with a maximum of 38%. The latter result is almost identical with the 33% $NO_x$ reduction that was measured in November 1999 in the same boiler at the same location but with only two injectors, instead of the three used in the present tests. The urea/NO mol ratio was about 1, which indicates a more efficient use of urea than had been measured in the 20 MMBtu/hr combustor.

The $SO_2$ reduction in these tests was 7% in the $1^{st}$ test and between 11% and 20% in the $2^{nd}$ test at an average Ca/S mol ratio of 1. The low $SO_2$ reduction in the $1^{st}$ test was most probably due to the limited insertion depth of the injectors and due to substantial fluctuations in the injection rate in this test, which was due to variations in the compressed air pressure to the injectors. The wide variation in the $2^{nd}$ test was due to the rapidly increasing uncontrolled $SO_2$ emission prior to the start of injection. Also, the results may have also been affected by incomplete coverage of region 36 of FIG. 3 by the droplet stream.

The August 2000 test was repeated in October 2000 with the additional objective of validating the observation that the effective viscosity of a 22% lime-5.6% urea-72.4% water slurry is somewhat less than the 30 cp of a 30% lime-75% water mixture, and not in the 1000 cp range as deduced from a static viscosity measurement. The Grainger Company's 2PC31, 2 stage centrifugal pump was used to pump this slurry from ground level to the $6^{th}$ floor of the 50 MW boiler house, an elevation of under 100 feet. 100 feet equals to 43 psig from gravity. For a 20 gpm flow, the pressure increase by the 2PC31 pump is 70 psig. The pressure drop in a 1 inch internal diameter, 100 foot long hose is 10 psig as computed from Rohsenow (loc.cit. Eq. 4.19). The pressure drop in the hose is a function of a friction factor, f, which in turn depends on the Reynolds number. For the 20 gpm water flow through the 1 inch diameter, 100 foot hose, f is about 0.005. However, with a viscosity of 30 cp for the lime-urea-water mixture, the Reynolds number is about 4000, at the transition from laminar to turbulent flow. This increases f to about 0.012, and the pressure drop in the hose to 24 psig. The gravity and flow pressure drop is 67 psig, (24+43), which is near the 70 psig rating of the 2PC31 pump.

The October test validated this pressure analysis in that 200 gallons of this lime-urea-water mixture were pumped in a matter of minutes with the 2PC31 pump from ground level to the 6th floor of the 50 MW boiler house. If the viscosity of the above lime-urea-water mixture had been in the 1000 cp range, the Reynolds number, Rey, in the 1 inch hose would have been 120, which is in the laminar flow range, the friction factor, f, would have been Rey/16 or 0.132. For a 100 foot long hose, the pressure loss would have been almost 1000 psig, which is clearly beyond the range of centrifugal pumps, and requires gear or progressive cavity pumps.

A second very important result of the combined $SO_2$—$NO_x$ tests in October 2000 was the observation that all elements in the method for practicing this invention are critical to its implementation. In the October test, the $SO_2$ reduction of 7.3% was obtained at a calcium/sulfur mol ratio, Ca/S, of only 0.54. This was partly due to the low Ca/S ration, and partly due to an operational error. A cooling valve to one of the three injectors was left open, and it blocked the lime-urea-water flow. Therefore, only two injectors were functioning. In the $2^{nd}$ August test, the $SO_2$ reduction was 20% at double the Ca/S ratio of 0.98 and with all 3 injectors. This is consistent with the October result. However, there was no $NO_x$ reduction in the October tests compared to the 30% to 40% range in August. Subsequent to the October test, it was found that the water cooling annular pipe 29 around the air feed pipe 22 of FIG. 2A was plugged with dried lime.

This occurred because no external water cooling pipe 29 was placed around the lime-water pipe 23 during these tests. Instead, during insertion and removal of the injectors into the boiler, cooling water for the air pipe was branched off to keep pipe 23 cool prior to starting and after stopping the injection of the lime-urea-water mixture. After insertion a valve the water flow to pipe 23 was cut off manually with a valve while simultaneously a valve that connected pipe 23 to the lime-urea water mixture feed was opened. During this transfer some of the mixture entered pipe 29 in both remaining injectors and blocked the cooling water. That no $NO_x$ reduction was obtained showed that the compressed air in pipe 23 must be cooled. If not the air is heated and causes the droplets to partially vaporize in the injector head 210, which interferes with the atomization process in injector head 210. Therefore, it is essential to separate the cooling water flow in pipes 29 from the liquid flow in pipe 23 by complete isolation or by means of backflow preventing check valves.

In any case, these results confirm that combined $SO_2$ and $NO_x$ reductions can be achieved by injection of aqueous droplets containing a mixture of lime and urea. The low $SO_2$ reduction in the 50 MW boiler test is an indication that either the injectors must be inserted deeper into the combustion gas zone to allow deeper penetration of the droplets into the gas stream, and/or that additional injectors are needed to completely disperse the lime through the $SO_2$ reaction zone. In view of the simplicity and low cost of the injectors design disclosed in this invention, improvements in $SO_2$ performance, such as adding more injectors, can be easily implemented at minimal cost.

It is understood that the results shown in this invention disclosure are only meant to convey the procedure to be followed in practicing $SO_2$ and $NO_x$ reductions with injection of lime powder or lime slurry or very fine limestone powder or slurry or lime and urea slurry. Using these techniques one can readily optimize the number of injectors and the placement of said injectors in a boiler needed to maximize the $NO_x$ and $SO_2$ reduction in coal fired boilers.

While the invention has been described in terms of its preferred embodiments, those skilled in the art will recognize that the invention can be practiced with modification within the spirit and scope of the appended claims.

What is claimed is:

1. A method of reducing the concentration of sulfur dioxide, $SO_2$, in an effluent gas stream from the combustion of carbonaceous fuel in a boiler or furnace, comprising the steps of:

identifying a gas combustion temperature zone within said boiler or furnace which ranges from about 1700° F. to 2200° F.;

injecting an aqueous liquid mixture into contact with an effluent gas stream in said gas combustion temperature zone within said boiler or furnace, said aqueous liquid mixture comprising dispersed reducing agents consisting of solid particles of lime or very fine limestone or similar acting $SO_2$ reducing agents, with or without a surfactant and stabilizer chemical agent to aid in the suspension and dispersion of said solid particles in said liquid and said step of injecting being performed with at least one injector, said step of injecting being performed with a nozzle that forms a flat, planar spray that is a fan shaped spray pattern which is oriented perpendicular to said effluent gas stream and is of sufficient cross-sectional area to intercept all of the effluent gas flow in said gas combustion temperature zone; and producing droplets of a non-uniform variable size ranging from 10 $\mu$m to 1000 $\mu$m where a mean and maximum size of said droplets depend on dimensions of said furnace or boiler, said producing step taking place during said injecting step by varying hydraulic and air atomizing pressures in said injector in order to permit distribution and vaporization of different sized droplets at different locations within said combustion temperature zone, and adjusting a position of an injector droplet outlet of said injector within said boiler or furnace based on an outer edge of said gas combustion temperature zone identified in said identifying step, said adjusting step positioning said injector droplet outlet adjacent to said outer edge of said gas temperature zone identified in said identifying step.

2. A method in accordance with claim 1 where each of said one or more injectors has an atomizing air chamber with outlets for said droplets and inlets for liquid and air and each of said one or more injectors is connected to a pressurized aqueous liquid, containing dispersed particles, filled pipe, and a parallel compressed air pipe, wherein said air pipe and liquid filled pipe are each placed inside and co-axially within an outer water cooling flow pipe containing water flowing at sufficient rates to prevent boiling at about atmospheric pressure of all said liquids in all the pipes and inside the droplets injector head which is placed in contact with the said hot gas temperatures, wherein said outer water cooling flow pipes terminate a slight distance upstream of said compressed air and solution dispersed particle filled pipes, thereby allowing the cooling water to exit the outer cooling pipes and cool the rear of the injector head by evaporative cooling, with the balance of the outer cooling water flow entering the furnace being treated and evaporating.

3. A method in accordance with claim 2 where said outer water cooling pipe is replaced with a high temperature insulating material consisting either of ceramic fiber cloth or ceramic cement coating surrounding the inner air pipe, and with said ceramic material being of sufficient thickness to maintain the inner air flow at a temperature low enough to prevent boiling of the inner liquid in the injector atomizing chamber.

4. A method in accordance with claim 1 where the concentration of said solid particle reducing agent dispersed in the aqueous liquid can be as high as 30% by weight without the addition of surfactants or stabilizers, and where said particles are maintained in uniform dispersion in said aqueous liquid by continuous mechanical stirring or by continuous re-circulation with a pump of said liquid mixture in the several tanks containing said mixture, and, if necessary, by the addition of a surfactant and stabilizer chemical agent to aid in maintaining said uniform dispersion.

5. A method in accordance with claim 1 where the injection rate of said reducing agent into said effluent gas stream being treated is at a mol flow rate that is at least one times greater than the mol flow rate of untreated gaseous sulfur dioxide in said effluent gas stream.

6. A method in accordance with claim 1 where said injectors are placed with their droplet outlet orifices into the hot gas flow being treated to a position at the outer edge of the combustion gas temperature zone, of about between 1700° F. and 2200° F., and where the droplets emerging from said injector or injectors are directed only into the entire gas flow region being treated at said temperature at which the efficient reaction of the chemical agent and the pollutant is favored, and where said injector droplet outlet orifices are moved either manually or by an automated control to remain at said outer temperature edge as said temperature edge changes due to changes in the boiler load.

7. A method in accordance with claim 1 where said gas combustion temperature zone at which the said injectors are inserted is determined by means of a thermocouple with a bare exposed tip that is inserted into said gas stream being treated, with said thermocouple tip being recessed within a ceramic tube where said ceramic tube is held in place in a hollow metal pipe, which is connected to a vacuum source that draws said hot gas into said ceramic tube to measure the gas temperature, and where said pipe is surrounded by an outer pair of pipes wherein flows cooling water to the end of said inner pipe containing the thermocouple wire and returns through the outer of said pair of cooling pipes.

8. A method in accordance with claim 1, further comprising the steps of forming said aqueous liquid mixture from a reducing agent in a powder form by delivering said reducing agent to said boiler or furnace by unloading said reducing agent from a supply tanker having bottom discharges suitable for discharge through a metering rotary valve or helical screw feeder to a pneumatic conveying eductor, with said eductor connected to a pipe conveying said reducing agent powder to a water tank, where said reducing agent is dispersed and mixed with water and maintained in uniform dispersion by continuous mechanical stirring, and, if necessary, by the addition of a chemical surfactant and stabilizer, and conveying said mixture by means of a submersible pump that maintains the prime to a high pressure centrifugal or progressive cavity pump to a second tank, with said second tank also containing a submersible pump that maintains a continuous prime to a high pressure liquid pump that re-circulates part of the flow to said second tank and feeds the balance of the aqueous mixture to said injector with said liquid and compressed air injection rates controlled by suitable flow meters, pressure gauges and valves.

9. A method in accordance with claim 2, where said air pipe and liquid filled pipe are each cooled by an external, coaxial jacket pipe having flowing water, at a rate controlled by flow meters, pressure gauges and valves, and supplied by a gravity fed tank to maintain the cooling flow in the event of a power failure.

10. A method in accordance with claim 1, further comprising the step of inserting said injector through pre-existing ports on said boiler or furnace.

11. A method in accordance with claim 4 where said surfactant and stabilizer is mixed in said aqueous liquid mixture at concentration that are less than 1% by weight.

12. A method in accordance with claim 1 where hydraulic injectors producing either a flat fan spray of a conical spray, depending on the boiler configuration and rating, are used in place of air atomized injectors.

13. A method in accordance with claim 4 where said mechanical stirring preferably consist of one or more propellers placed at several locations along a shaft, with said propellers having an outer diameter that is at least one-third, and more than one-half of the inner diameter of said tank containing said solid-liquid mixture, and with said shaft being rotated by a motor at a speed sufficient to induce high shear flow in said tanks.

14. A method in accordance with claim 1 where for small industrial boilers or furnaces wherein said liquid injectors are replaced by one or more externally insulated metal tubes containing said $SO_2$ reducing agent, including lime, in dry powder form, and where said reducing agent is transported pneumatically in said metal tubes to the high temperature gas region in the range of 1700° F. to 2200° F. being treated for $SO_2$ removal, with the outlet of said tubes being inserted into the outer edge of the high temperature region of the boiler or furnace being treated.

15. A method in accordance with claim 14 where said tubes are placed coaxially with the flow direction of the gas being treated, with said tubes being equally spaced along a circle whose diameter is a fraction of the diameter of the gas flow being treated so that the tubes are in close proximity to the outer edge of the gas flow being treated, with the number of said tubes being selected so as to uniformly disperse said $SO_2$ reducing agent throughout the gas volume being treated.

16. A method in accordance with claim 14 for intermediate or large boilers or furnaces where the outlet of said one or more pneumatic conveying tubes are flattened into ellipse shape so as to inject said dry $SO_2$ reducing agent in a flat fan spray pattern that intercepts said gas flow being treated in a plane that is perpendicular to the hot gas flow direction in said boiler or furnace.

17. A method in accordance with claim 1 where in addition to said $SO_2$ reducing agent dispersed in an aqueous mixture, a NOx reducing agent consisting of ammonia or urea or ammonia precursor is added to and dissolved in said mixture, with said NOx reducing agent being added at a concentration such that the mol flow rate of the NOx reducing agent into the furnace or boiler being treated is equal to or greater than the mol flow rate of the NOx species in the hot gas flow being treated.

18. A method in accordance with claim 17 where said NOx reducing agent concentration is about a factor five to ten lower in concentration than that of the $SO_2$ reducing agent.

19. A method in accordance with claim 1 where the optimum placement of the several said injectors into furnaces or boilers of varying size can best be optimized by firing said furnaces or boilers with gas or oil or a low sulfur coal and adding sulfur powder through injection ports that are separate from the fuel injection ports in order to duplicate the higher $SO_2$ concentrations that are encountered in regular and extended furnace or boiler operation.

20. A method in accordance with claim 19 where said sulfur powder is mixed uniformly with another fine combustible powder material including fine sawdust or low sulfur pulverized coal at a mixture ratio such that the feed rate of the mixture is sufficiently high to result in a steady and uniform injection rate into the furnace being evaluated for $SO_2$ reduction.

21. A method in accordance with claim 8 where said high pressure, single or multi-stage centrifugal pump is either attached to an electric motor of sufficient capacity to overcome the added power required to pump the higher viscosity aqueous lime mixture, or to an electric motor rated for operation with low viscosity water only that is driven by a variable alternating frequency electronic drive such that the motor speed is reduced to maintain the pump motor within its rated thermal limits.

22. A method in accordance with claim 1 where said outer water-cooled pipe surrounding said aqueous mixture pipe is eliminated and replaced with a ceramic insulating material and where further water is forced though said aqueous mixture pipe during insertion of and removal of said injector in said boiler or furnace.

23. A method in accordance with claim 22 where during startup and shutdown, cooling water in said aqueous mixture pipe is separated from said aqueous mixture flow by backflow check valve or by separate flow circuits to prevent the mixing of the two liquid flows.

24. A method of reducing the concentration of sulfur dioxide, $SO_2$, in an effluent gas stream from the combustion of carbonaceous fuel in a boiler or furnace, comprising the steps of:

identifying a gas combustion temperature zone within said boiler or furnace which ranges from about 1700° F. to 2200° F.;

injecting an aqueous liquid mixture into contact with an effluent gas stream in said gas combustion temperature zone within said boiler or furnace, said aqueous liquid comprising dispersed reducing agents consisting of solid particles of lime or very fine limestone, or similar acting $SO_2$ reducing agent, with or without a surfactant and stabilizer chemical agent to aid in the suspension and dispersion of said solid particles in said liquid and said step of injecting being performed with at least one injector, said step of injecting being performed with a nozzle that forms a conical spray pattern which is oriented coaxial with said effluent gas stream and is of sufficient cross-sectional area to intercept all of the effluent gas flow in said gas combustion temperature zone; and producing droplets of a non-uniform variable size ranging from 10 μm to 1000 μm where a mean and maximum size of said droplets depend on dimensions of said furnace or boiler, said producing step taking place during said injecting step by varying hydraulic and air atomizing pressures in said injector in order to permit distribution and vaporization of different sized droplets at different locations within said combustion temperature zone, and adjusting a position of an injector droplet outlet of said injector within said boiler or furnace based on an outer edge of said gas combustion temperature zone identified in said identifying step, said adjusting step positioning said injector droplet outlet adjacent to said outer edge of said gas temperature zone identified in said identifying step.

* * * * *